United States Patent [19]

Govindaraj

[11] Patent Number: 6,113,649
[45] Date of Patent: *Sep. 5, 2000

[54] OBJECT REPRESENTATION OF PROGRAM AND SCRIPT COMPONENTS

[75] Inventor: Naresh K. Govindaraj, San Jose, Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/622,400

[22] Filed: Mar. 27, 1996

[51] Int. Cl.$^7$ ........................................................ G06F 9/44
[52] U.S. Cl. ........................................ 717/2; 717/3; 717/7
[58] Field of Search ..................................... 395/701, 702, 395/703, 157; 717/2, 3, 7

[56] References Cited

U.S. PATENT DOCUMENTS

| | | | |
|---|---|---|---|
| 4,742,467 | 5/1988 | Messerich et al. | 364/200 |
| 4,845,665 | 7/1989 | Heath et al. | 364/900 |
| 4,860,204 | 8/1989 | Gendron et al. | 364/300 |
| 5,202,828 | 4/1993 | Vertelney et al. | 364/419 |
| 5,206,951 | 4/1993 | Khoyi et al. | 395/683 |
| 5,295,222 | 3/1994 | Wadhwa et al. | 395/1 |
| 5,303,379 | 4/1994 | Khoyi et al. | 395/710 |
| 5,321,804 | 6/1994 | Kusaba et al. | 395/145 |
| 5,341,478 | 8/1994 | Travis, Jr. et al. | 395/200 |
| 5,388,203 | 2/1995 | Kaneko | 395/159 |
| 5,396,630 | 3/1995 | Banda et al. | 395/683 |
| 5,404,441 | 4/1995 | Satoyama | 395/155 |
| 5,465,362 | 11/1995 | Orton et al. | 395/700 |
| 5,475,817 | 12/1995 | Waldo et al. | 395/683 |
| 5,481,712 | 1/1996 | Silver et al. | 395/700 |
| 5,481,718 | 1/1996 | Ryu et al. | 395/700 |
| 5,517,606 | 5/1996 | Matheny et al. | 395/156 |
| 5,530,864 | 6/1996 | Matheny et al. | 395/700 |
| 5,537,630 | 7/1996 | Berry et al. | 395/701 |
| 5,542,024 | 7/1996 | Balint et al. | 395/161 |
| 5,555,365 | 9/1996 | Selby et al. | 395/159 |
| 5,555,370 | 9/1996 | Li et al. | 395/161 |
| 5,559,946 | 9/1996 | Porter | 395/157 |
| 5,566,294 | 10/1996 | Kojima et al. | 395/159 |
| 5,603,034 | 2/1997 | Swanson | 395/701 |
| 5,682,535 | 10/1997 | Knudsen | 395/701 |
| 5,710,926 | 1/1998 | Maurer | 395/701 |
| 5,732,271 | 3/1998 | Berry et al. | 395/683 |
| 5,878,425 | 3/1999 | Redpath | 707/102 |
| 5,892,948 | 4/1999 | Ryuichi et al. | 395/701 |

OTHER PUBLICATIONS

A Visual Method for Generating Ironic Programming Environments D. Wethey, Aug. 1992.
Visual Tools for Generating Ironic Programming Env Witney et al, Sep. 1992.
Complete Visualizations of Concurrent Programs and Their Executions K Nahn, Oct. 1990.
Formal Definition of Control Semantics in a Completely Visual Language, Sep. 1993.
A Framework for Visualizing Object Oriented Systems, Oct. 25, 1993.
Concurrent Constraint Programs to Parse and Animate Pictures of Concurrent Constraint Programs, Jun. 1992.
Toward Visual Concurrent Constraint Programming, Jun. 1992.
Inside Windows 3.1, 1992.
Blue and White Series Report, 1992.
Visual Object Oriented Programming Concepts and Environments M. Burnett, 1994.
Microsoft Visual C ++ Development System for Windows, vol. 1, Class Library Reference For the Microsoft Foundation Class Library pp. 95–120, 328–337, 1993.
Forte Version 1.0 Jun. 30, 1994 A guide to the Forte Workshop Labeled Work.
Forte Version 1.0 Jun. 30, 1994 System Management Guide Labeled Tool.
Forte Version 1.0 Jun. 30, 1994 System Management Guide Labeled SYS.
IBM SOMobjects Developer Toolkit Version 2.0 Jun. 1993.
The Common Object Request Broker Architecture and Specification 1.1 Dec. 1991.
IBM/JOSS Object Services Persistence Service Specification Nov. 15, 1993.

*Primary Examiner*—Tariq R. Hafiz
*Assistant Examiner*—Todd Ingberg
*Attorney, Agent, or Firm*—Sterne, Kessler, Goldstein & Fox P.L.L.C.

[57] ABSTRACT

A system and method for object representations of program and script components. A graphical user interface displays a plurality of program components in a plurality of rows in a scrollable table. Each scrollable table comprises a first column that contains iconic representations of the program components and a second column that contains generated program code for the program components. An operator edits the program by manipulating the icons, editing invocation of dialogs or editing the generated program code directly.

23 Claims, 22 Drawing Sheets

OBJECT REPRESENTATION OF PROGRAM AND SCRIPT COMPONENTS

CROSS-REFERENCE TO OTHER APPLICATIONS

The following applications of common assignee contain some common disclosure with that of the present application.

"System and Method for Constructing Dialogs for Commands and Templates," Ser. No. 08/464,534, filed Jun. 5, 1995, Attorney Docket No. ST9-95-005 (1252.2070000), incorporated herein by reference.

"System and Method for Constructing Computer Programs Using Dialogs and Objects," Ser. No. 08/462,427, filed Jun. 5, 1995, Attorney Docket No. ST9-95-006 (1252.2080000), incorporated herein by reference.

"A Computer Program Product for Enabling the Construction of Computer Programs Using Dialogs and Objects," Ser. No. 08/465,244, filed Jun. 5, 1995, Attorney Docket No. ST9-95041 (1252.2180000), incorporated herein by reference.

"A Computer Program Product for Enabling the Construction of Dialogs for Commands and Templates," Ser. No. 08/465,237, filed Jun. 5, 1995, Attorney Docket No. ST9-95040 (1252.2190000), incorporated herein by reference.

"Object Oriented Central Maintenance for Programs and Scripts," Ser. No. 08/622,634, filed Mar. 27, 1996.

Attorney Docket No. ST9-95-019 (1252.2310000), having an effective filing date identical with that of the present invention, incorporated herein by reference.

DESCRIPTION

1. Technical Field

The present invention relates generally to the construction of computer programs (software), and more particularly to the construction of computer programs using Object Oriented programming.

2. Background Art

The generation of computer programs is complicated by a number of factors. One factor is the complexity of the syntax and structure of many computer programming languages. Another factor, which relates to a computer program that is intended to control a system (such software is called a system control program), is the complexity of the specification that defines the system. These complicating factors make it difficult for even the most experienced computer programmers to write computer programs, and almost impossible for less experienced programmers to write computer programs.

Consider, for example, a database system environment where periodic system maintenance must be performed to maintain system resources. Such system maintenance involves routine tasks (such as an off-line copy) and non-routine tasks (such as a database recovery operation). These routine and non-routine tasks are performed by generating and executing system control programs. The system control programs are written in an appropriate computer program language, such as Job Control Language (JCL).

The structure and syntax of JCL is complex and difficult to specify. Also, database system environments are often very complex. For example, if a task involved recovering fifty databases, then it would be necessary to know the attributes (such as the name, volume, space, etc.) for all of the databases, so as to construct the proper JCL computer program to perform the recovery task. The collection of such attribute information is very complex. These complexities make it difficult to construct system control programs.

Thus, what is required is a system and method for facilitating the construction of computer programs. Moreover, due to the complexity and volume of system control programs, what is needed is an efficient system and method for maintaining and updating the system control programs.

3. Disclosure of Invention

The foregoing and other objects, features and advantages of the invention will be apparent from the following more particular description of a preferred embodiment of the invention, as illustrated in the accompanying drawings.

Briefly stated, the invention is directed to a system and method for facilitating the construction of computer programs. The invention provides a system and method for generating a graphical user interface that displays a plurality of program components in a plurality of rows in a scrollable table. Within this scrollable table, one or more icons are placed in a first column in at least one of the plurality of rows. Each icon in a particular row provides an object representation for the program component in that particular row. Additionally, generated program code for the program components is placed in a second column of said scrollable table. With this graphical user interface, an operator may edit the program at either a high level (i.e., iconic) or at a lower level (i.e., generated program code) simultaneously.

According to one embodiment, the invention is a computer program product (also called a program storage device) comprising computer readable medium having stored therein control logic. The control logic enables a computer to operate as indicated above, and as further described below.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the digit(s) to the left of the two rightmost digits in the corresponding reference number.

BRIEF DESCRIPTION OF DRAWINGS

The present invention will be described with reference to the accompanying drawings, wherein.

BEST MODE FOR CARRYING OUT THE INVENTION

The present invention is a system and method for facilitating the construction of computer programs using dialogs for commands (from a computer programming language) and templates.

In an embodiment of the invention, JCL (Job Control Language) is used as the computer programming language, although other computer programming languages could alternatively be used. Also, the computer programs constructed by the invention represent system control programs, although other types of computer programs could alternatively be constructed. Generally speaking, the invention is useful for constructing computer programs where (1) the syntax and structure of the computer programming language are complex, and/or (2) the target environment (i.e., the computing environment in which the computer programs are to be executed) is complex. However, it should be understood that the invention can also be used to construct computer programs where neither (1) nor (2) is true.

An administrator (defined as a person experienced with the computer programming language and the target environment) generates a dialog for a command (called a command dialog) by specifying the format and the syntax of the command. The administrator generates a dialog for a template (called a template dialog) by specifying a group of command dialogs, where the commands associated with the command dialogs are collectively useful for performing a task.

An user (defined as a person less experienced with the computer programming language and/or the target environment) generates a computer program by invoking a command dialog associated with a command useful for performing a desired task. Upon invocation, the dialog interacts with the user to obtain parameter values necessary to execute the command. The command and parameter values are then automatically written to the computer program in the proper format and syntax. The user continues to invoke command and template dialogs until the computer program is complete. (It should be understood that the administrator could also invoke dialogs to construct computer programs.)

Figure 1:
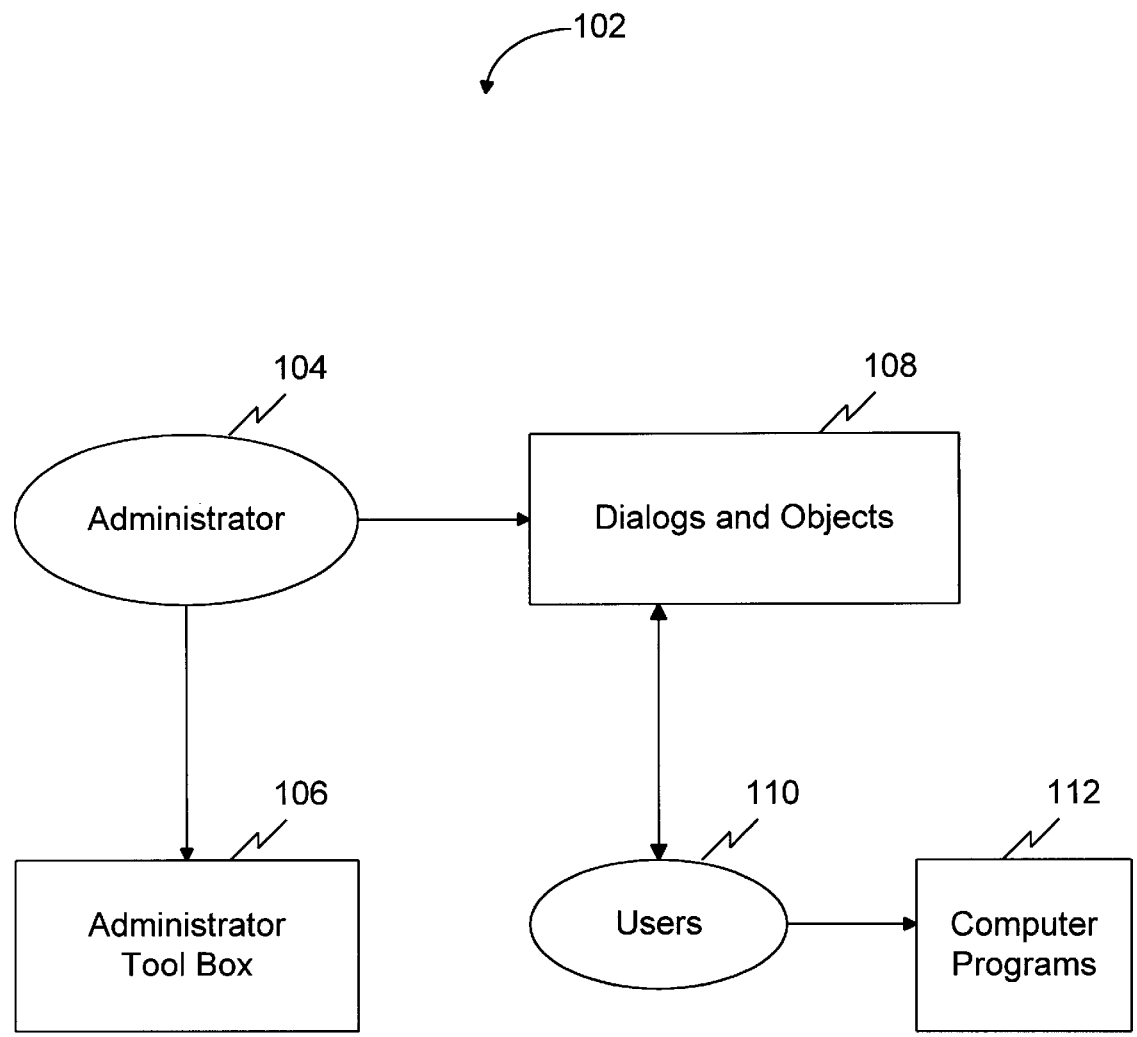
FIG. 1 generally illustrates the manner in which dialogs and objects are generated from an administrator tool box, and the manner in which such dialogs and objects are used to generate computer programs.

As shown in FIG. 1, the invention provides an administrator tool box 106 containing tools that an administrator 104 uses to generate dialogs and objects 108 (objects are described below). Users 110 utilize the dialogs to generate computer programs 112.

Accordingly, the users 110 do not have to have a detailed understanding of the computer programming language or the target environment in order to construct computer programs. Instead, the users 110 need only invoke dialogs to construct computer programs. Accordingly, the present invention facilitates the construction of computer programs. Additionally, since computer programs 112 are constructed by invoking dialogs (rather than by writing code directly), the invention promotes and enhances software reusability and standardization.

Figure 2:
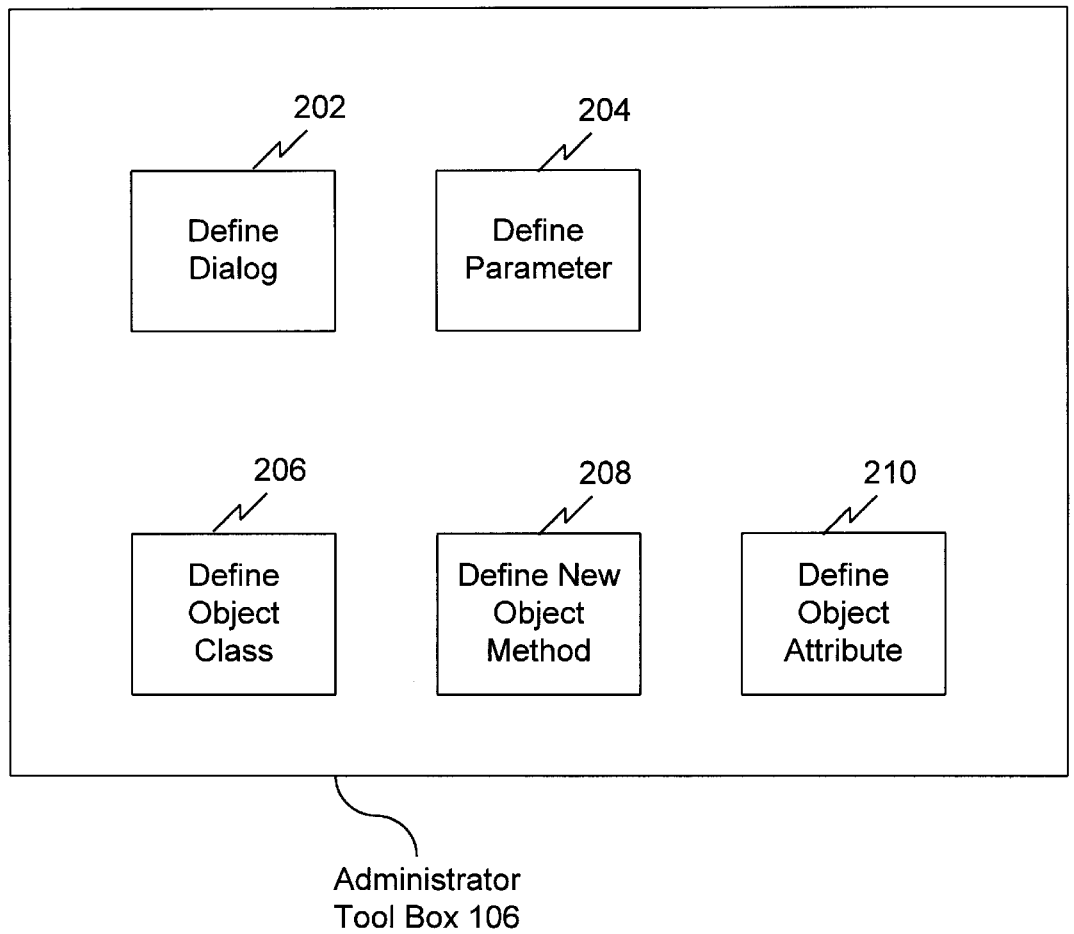
FIG. 2 is a block diagram of the administrator tool box according to a preferred embodiment of the invention.

FIG. 2 is a block diagram of the administrator tool box 106. The administrator tool box 106 includes a define dialog module 202, a define parameter module 204, a define object class module 206, a define new object method module 208, and a define object attribute module 210. These modules 202, 204, 206, 208, 210 represent tools that the administrator 104 can use to generate dialogs and objects 108. These modules 202, 204, 206, 208, 210 are preferably software modules/programs written in any well known and appropriate computer language. These modules 202, 204, 206, 208, 210 are further described below.

Figure 3:
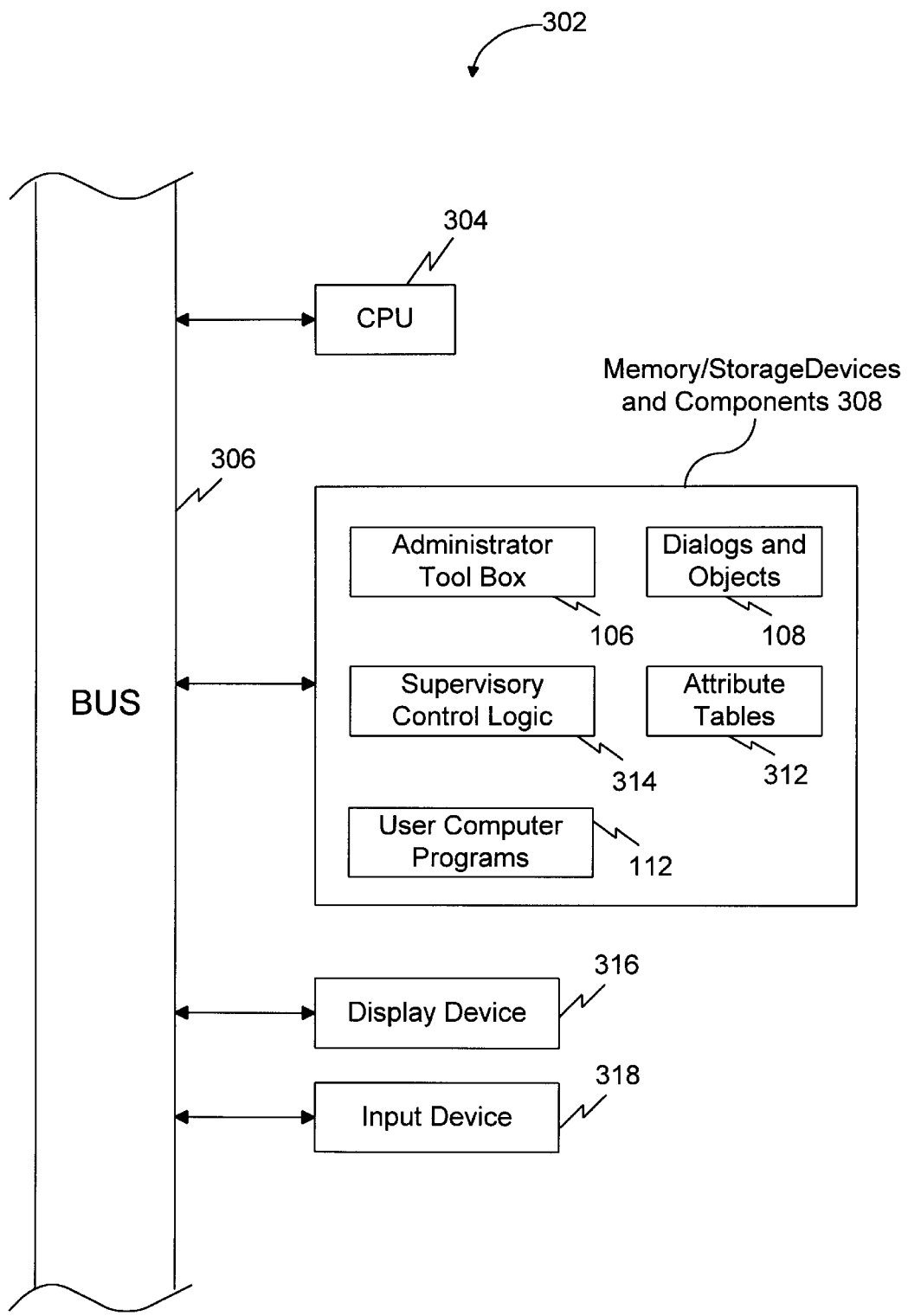
FIG. 3 is a block diagram of a preferred computer system of the present invention.

FIG. 3 is a block diagram of a computer system 302. This computer system 302 could be used by the administrator 104 to generate the dialogs and objects 108. This computer system 302 could also be used by the users 110 to generate computer programs 112 using the dialogs and objects 108 (alternatively, the administrator 104 and the users 110 could operate on different computer systems). The computer system 302 can be implemented using any suitable commercially available computer system.

The computer system 302 includes one or more processors, such as CPU (central processing unit) 304, connected to a bus 306. Also connected to the bus 306 are a number of memory/storage devices and components 308 representing, for example, main memory RAM (random access memory), a hard drive, removable storage devices such as floppy drives, CD drives, and tape drives, and computer program products (also called program storage devices) such as computer storage disks, compact disks, optical disks, magnetic tapes, etc. Such computer program products have computer readable mediums with data and control logic (software) recorded thereon.

Stored in the memory/storage devices and components 308 are the administrator tool box 106, the dialogs and objects 108, attribute tables 312, supervisory control logic 314, and user computer programs 112. These are described below.

The computer system 302 also includes a display device 316 (such as a monitor) and one or more input devices 318 (such as a keyboard, mouse, track ball, etc.).

1. Generating Computer Programs By Using Dialogs

Figure 4:
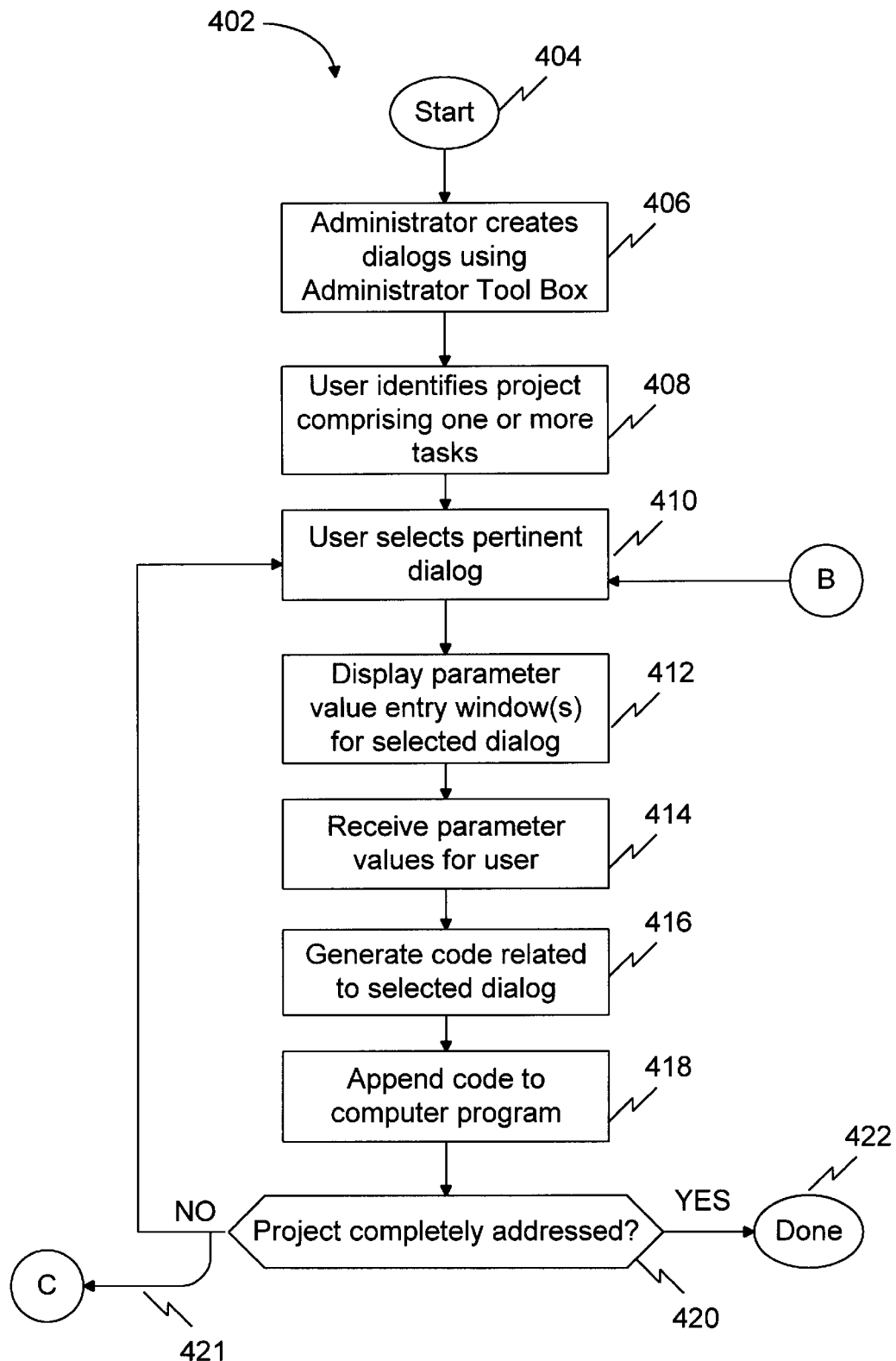
FIGS. 4, 5, 9A, 9B, 10, 17, 19 and 22 are flowcharts depicting the operation of the present invention.

The manner in which a computer program 112 is constructed through the use of dialogs shall now be described in detail with reference to a flowchart 402 presented in FIG. 4. Flowchart 402 begins with step 404, where control immediately passes to step 406.

In step 406, the administrator 104 creates a plurality of dialogs using the tools in the administrator tool box 106. In practice, the administrator 104 creates a dialog for each task and/or function that may later form part of or all of a computer program 112. For example, in a database environment, the administrator 104 may create a dialog for an off-line image copy function, a dialog for a database recovery function, etc. It should be understood that the creation of dialogs by the administrator 104 is preferably an ongoing process. Over time, in response to requests from users 110, for example, new dialogs are created, and old dialogs are modified and/or deleted. Accordingly, the performance of step 420 occurs repeatedly over time, and not necessarily in the order shown in FIG. 4.

Figure 5:
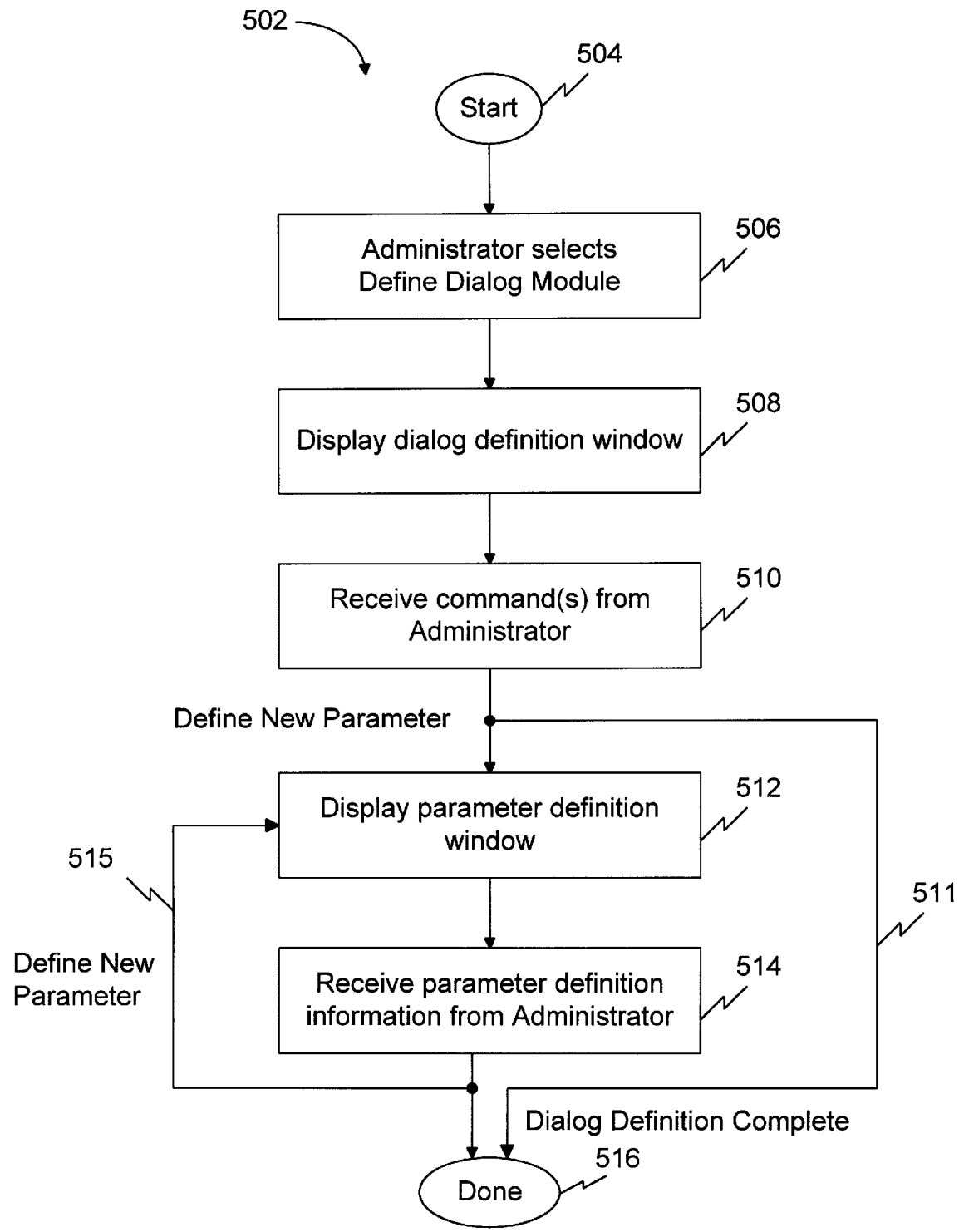

Step 406 shall now be described in greater detail with reference to a flowchart 502 in FIG. 5, which depicts the manner in which a single dialog for a command is defined. Flowchart 502 is performed for each command dialog that the administrator 104 wishes to define. Flowchart 502 begins with step 504, where control immediately passes to step 506.

In step 506, the administrator 104 indicates that he wishes to interact with the define dialog module 202. The administrator 104 preferably does this by invoking the define dialog module 202 in any well known manner, such as by selecting (with a pointing device, for example) an icon corresponding to the define dialog module 202. It is noted that the user interface functionality described in this paragraph (i.e., displaying the icon corresponding to the define dialog module 202, and responding to an user command via a pointing device to invoke the define dialog module 202) is provided by the supervisory control logic 112 in a well known manner.

Figure 6:
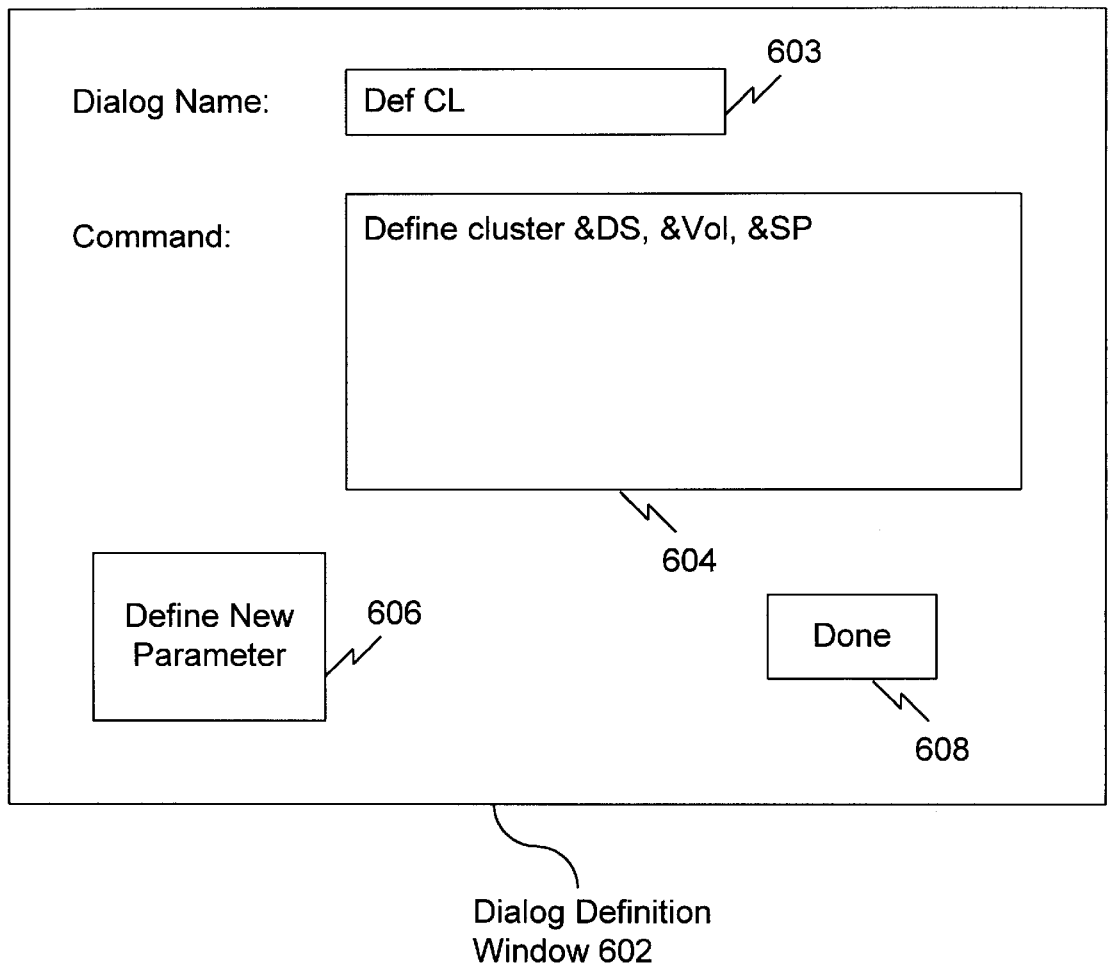
FIGS. 6, 7, 8, 11, 12, and 13 are exemplary windows used by the invention to interact with administrators and users.

In step 508, the define dialog module 202 displays a dialog definition window 602 as shown in FIG. 6. The dialog definition window 602 includes a dialog name field 603 in which the administrator 104 can enter the name of the dialog being defined, a command field 604 in which the administrator 104 may enter the format/syntax of one or more commands (the format/syntax for each command is also called a command string), a define new parameter button 606 which the administrator 104 may press in a well known manner to define a parameter of the command, and a done button 608 which the administrator 104 may press in a well known manner once the command has been completely defined.

In step 510, the define dialog module 202 receives from the administrator 104 the format/syntax for one or more commands. These commands are displayed in the command field 604. These commands are from the computer programming language of the computer program 112 being constructed. Thus, if the computer programming language is JCL, then these commands would be from the JCL computer programming language. In the example shown in FIG. 6, the define dialog module 202 in step 510 received from the administrator 104 the format/syntax of the "define cluster" command.

This command has three parameters, denoted by &DS, &Vol, and &SP in the command field 604 (these are each also called a parameter string). However, the administrator 104 has not yet defined these parameters. The administrator 104 defines a parameter by pressing the define new parameter button 606, at which time the define parameter module 204 is invoked. The define parameter module 204 performs step 512. (Note that, if the command does not have any parameters, then control moves to step 516 as indicated by control line 511. In practice, control flows to step 516 after receiving an appropriate command from the administrator 104, such as when the administrator 104 presses the done button 608. Step 516 is described below.)

Figure 7:
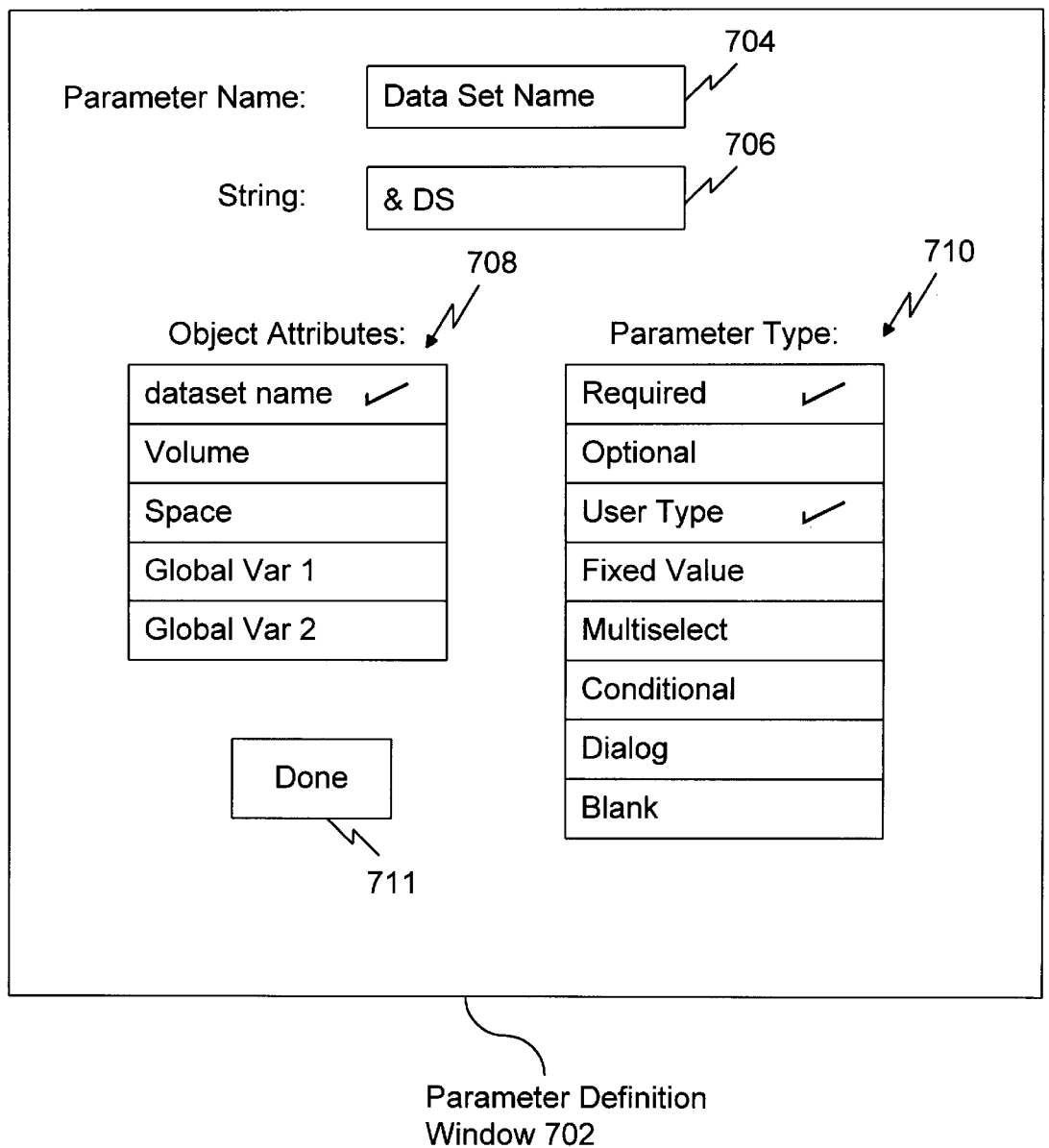

In step 512, the define parameter module 204 displays a parameter definition window 702 as shown in FIG. 7. The parameter definition window 702 has a parameter name field 704 in which the administrator 104 may enter the name of the parameter being defined, a string field 706 in which the administrator 104 may enter a string denoting the manner in which the parameter is represented in the command in question (i.e, the command displayed in the command field 604 of the dialog definition window 602), an object attributes field 708 in which the administrator 104 may indicate the object attribute that applies to the parameter (if any), a parameter type field 710 in which the administrator 104 may indicate the parameter type(s) of the parameter, and a done button 711 which the administrator 104 may press after the parameter has been completely defined.

In step 514, the define parameter module 204 receives from the administrator 104 parameter definition information, and displays this parameter definition information in the appropriate fields of the parameter definition window 702. In the example of FIG. 7, the parameter being defined is the Data Set Name parameter as shown in the parameter name field 704. This parameter is represented by the string "&DS" in the command in question (see the command field 604 in FIG. 6), as indicated in the string field 706. The administrator 104 has indicated that this parameter 30 represents a "dataset name" object attribute, as indicated by the check mark beside the "dataset name" entry in the object attributes field 708 (object attributes are discussed in greater detail below). The administrator 104 has also indicated that this parameter is a required user type parameter, as indicated by the check marks next to the "Required" and "User Type" entries in the parameter type field 710. Before proceeding further, it will be useful to discuss the preferred parameter types supported by the invention.

A required parameter (indicated by selecting the "Required" entry in the parameter type field 710) is one whose value must be provided by the user 110 when the associated dialog is invoked. An optional parameter (indicated by selecting the "Optional" entry in the parameter type field 710) is one whose value may be, but need not be, provided by the user 110 when the associated dialog is invoked.

A user type parameter (indicated by selecting the "User Type" entry in the parameter type field 710) is one whose value must be entered by the user 110 when the associated dialog is invoked. Preferably, when the dialog is invoked, the invention displays a conventional edit box to enable the user 110 to enter the value.

A fixed value parameter (indicated by selecting the "Fixed Value" entry in the parameter type field 710) is one that may only have a certain set of possible values. The administrator 104 must provide these values when the parameter is being defined. These values are displayed when the dialog is invoked, and the user 110 is required to select one of these values.

A multiselect parameter (indicated by selecting the "Multiselect" entry in the parameter type field 710) is one that can have multiple values. These values are entered by the user 110 (each value being separated by a delimiter, such as a comma or a semi-colon) when the dialog is invoked.

A conditional parameter (indicated by selecting the "Conditional" entry in the parameter type field 710) is one whose existence is conditional on the state of another parameter. The value for the conditional parameter is only entered by the user 110 if the condition is satisfied. Likewise, the conditional parameter only affects the execution of the command if the condition is satisfied. For example, supposes there are parameters P1 and P2. P2 can be defined to be conditional on whether or not a value of P1 is provided (in the case where P1 is an optional parameter). As another example, P2 can be defined to be conditional on whether or not P1 is equal to a certain value.

Some commands or templates may include other commands or templates in their representation. This represents an additional flexibility of the invention. This capability is achieved by the invention by the use of dialog parameters. A dialog parameter (indicated by selecting the "Dialog" entry in the parameter type field 710) is one whose value identifies another dialog. The command or template associated with this other dialog becomes embedded in the command in question.

The invention is not limited to the parameter types discussed above. Other parameter types will be apparent to persons skilled in the relevant art(s).

The dialog definition window 602 is redisplayed after all parameter definition information has been entered by the administrator 104 and received by the define parameter module 204 in step 514. In practice, this occurs after the administrator 104 has pressed the done button 711 in the parameter definition window 702. At this point (i.e., after the administrator 104 has pressed the done button 711 and the dialog definition window 602 has been redisplayed), the administrator 104 may define another parameter of the command in question by again pressing the define new parameter button 606 (at which time control returns to step 512 as indicated by control line 515). In practice, the administrator 104 presses the define new parameter button 606 once for each parameter of the command in question, so as to define each parameter.

If the administrator 104 has completed the definition of the dialog, then the administrator 104 presses the done button 608 in the dialog definition window 602. Processing of flowchart 502 is then complete as indicated by step 516. Information pertaining to this new dialog is saved, preferably as a record in a relational database table, for later access and processing. A dialog has been completely defined once its format/syntax has been defined, and once all of its parameters have been defined.

As indicated above, flowchart 502 represents the operation of the invention when defining a dialog for a command. The manner in which a dialog for a template is defined is similar to that shown in flowchart 502. However, when defining a template dialog, the define dialog module 202 in step 510 receives information from the administrator 104 that specifies one or more existing dialogs for inclusion in the new dialog being created. (When the new template dialog is invoked, each of the dialogs which form part of the new template dialog will be invoked in turn.) Template dialogs can also have their own parameters, in which case steps 512 and 514 are performed.

Referring again to FIG. 4, the user 110 performs steps 408–422 to construct a computer program 112 using dialogs. The user 110 uses the dialogs constructed by the administrator 104 in step 406 to construct this computer program 112. Steps 408–422 shall now be described.

In step 408, the user 110 identifies a project or job that must be performed. The project may be to recover a database, or to perform an off-line edit, for example. The project may include one or more tasks. In steps 410–422, the user 110 uses the dialogs to construct a computer program 112 to perform this project.

Specifically, in step 410, the user 110 selects (from a catalog, for example) a dialog that is pertinent to the project. For example, the selected dialog may correspond to a command that, when executed, performs one of the tasks of the project.

In step 412, the invention displays a parameter value entry window 802 (FIG. 8) that corresponds to the selected dialog and, more particularly, that corresponds to the command associated with the selected dialog (the display and the user interaction with the parameter value entry window 802 may be controlled by the supervisory control logic 314, for example). The parameter value entry window 802 has a field for each parameter of the command. The user 110 is able to enter values for these parameters in these fields.

For example, suppose that the selected dialog corresponds to the "Define cluster" command (the definition of which is shown in FIG. 6). This command has three parameters, &DS, &Vol, and &SP. The example parameter value entry window 802 shown in FIG. 8 corresponds to this dialog. Accordingly, the parameter value entry window 802 includes fields for these parameters, i.e., a data set name field 804 for parameter &DS, a volume field 806 for parameter &Vol, and a space field 808 for parameter &SP. The format and content of these fields correspond to the parameter types of these parameters. For example, if a parameter is defined as being a user type, then an edit box is presented. If a parameter is defined as being a fixed value parameter, then a list of possible values is presented. The user 110 enters values for the parameters into these fields 804, 806, 808.

In step 414, the invention (in particular, the supervisory control logic 314) receives these parameter values from the user 110.

In step 416, the invention (in particular, the supervisory control logic 314) generates code representative of the selected dialog and the user-provided parameter values. The code is in the computer programming language of the computer program 112 being generated. Also, the code is in the proper format and syntax as defined and required by the computer programming language.

The invention preferably performs step 416 by retrieving the command string that was displayed in the command field 604 of the dialog definition window 602, and then replacing the parameter strings in this command string with the parameter values provided by the user 110. For example, suppose that the selected dialog corresponds to the define cluster command, and that in step 414 the user entered DSN1 for the Data Set Name parameter, V1 for the Volume parameter, and SP1 for the Space parameter. In step 416, the invention preferably retrieves the following command string that represents the define cluster command (refer to FIG. 6):

Define cluster &DS, &Vol, &SP

There are three parameter strings in this command string: &DS, &Vol, and &SP. The invention replaces these parameter strings with the user-provided parameter values, to thereby generate the following code:

Define cluster DSN1, V1, SP1

This code is in the computer programming language of the computer program 112 being generated, and is in the proper format and syntax as defined and required by the computer programming language. Note, however, that the user 110 did not have to have a detailed understanding of the computer programming language in order to generate this code. Instead, the user 110 generated this code simply by invoking the appropriate dialog and providing the parameter values.

In step 418, the invention (preferably the supervisory control logic 314) adds the code to the computer program 112 being generated. In one embodiment, the invention appends the code to the computer program 112, although the user 110 may indicate other ways for inserting the code into the computer program 112.

In step 420, the user 110 determines whether the project identified in step 408 has been completely addressed by the computer program 112. If the project has not been completely addressed, then control flows back to step 410 to enable the user 110 to continue to generate the computer program 112 (alternatively, control flows along control line 421, which is described below). Otherwise, generation of the computer program 112 is complete, and flowchart 402 terminates, as indicated by step 422.

2. Generating Computer Programs By Applying Dialogs to Objects

According to the present invention, it is possible to define and instantiate objects that represent system components and resources. Once defined and instantiated, objects can be grouped together to represent the resources in a specific system. Dialogs may then be applied to any subset of these objects, to thereby generate a computer program 112 having code that, when executed, operates with the resources associated with the objects. Accordingly, this aspect of the invention represents another way for generating computer programs 112. The generation of computer programs 112 through the use of dialogs and objects shall now be further described with reference to a flowchart 902 in FIGS. 9A and 9B. Flowchart 902 begins with step 904, where control immediately passes to step 906.

In step 906, the administrator 104 creates a plurality of object classes using the tools in the administrator tool box 106. In practice, the administrator 104 creates an object class for each type of resource/component of interest in the target environment. For example, suppose that a business environment includes a plurality of payroll databases each having the same attributes. In this case, the administrator 104 may create an object class to represent such payroll databases. The business environment may also include a plurality of database logs, a plurality of personnel databases, and a plurality of image copies. In this case, the administrator 104 may create an object class to represent the database logs, another object class to represent the personnel databases, and another object class to represent the image copies.

It should be understood that the creation of object classes by the administrator 104 is preferably an ongoing process. Over time, in response to requests from users 110, for example, new object classes are created, and old object classes are modified and/or deleted. Accordingly, the performance of step 906 occurs repeatedly over time, and not necessarily in the order shown in FIG. 9. Also, new objects can be created by means of inheritance from existing objects. The details of such object creation will be apparent to persons skilled in the relevant art(s) based, at least in part, on the discussion contained herein.

Note that the administrator 104 preferably performs both step 906, to create object classes, and step 406 (FIG. 4), to create dialogs. Thus, prior to performing step 908, a plurality of object classes and dialogs exist. The definition of object classes depends on the definition of dialogs, and vice versa. This is described below.

Figure 10:
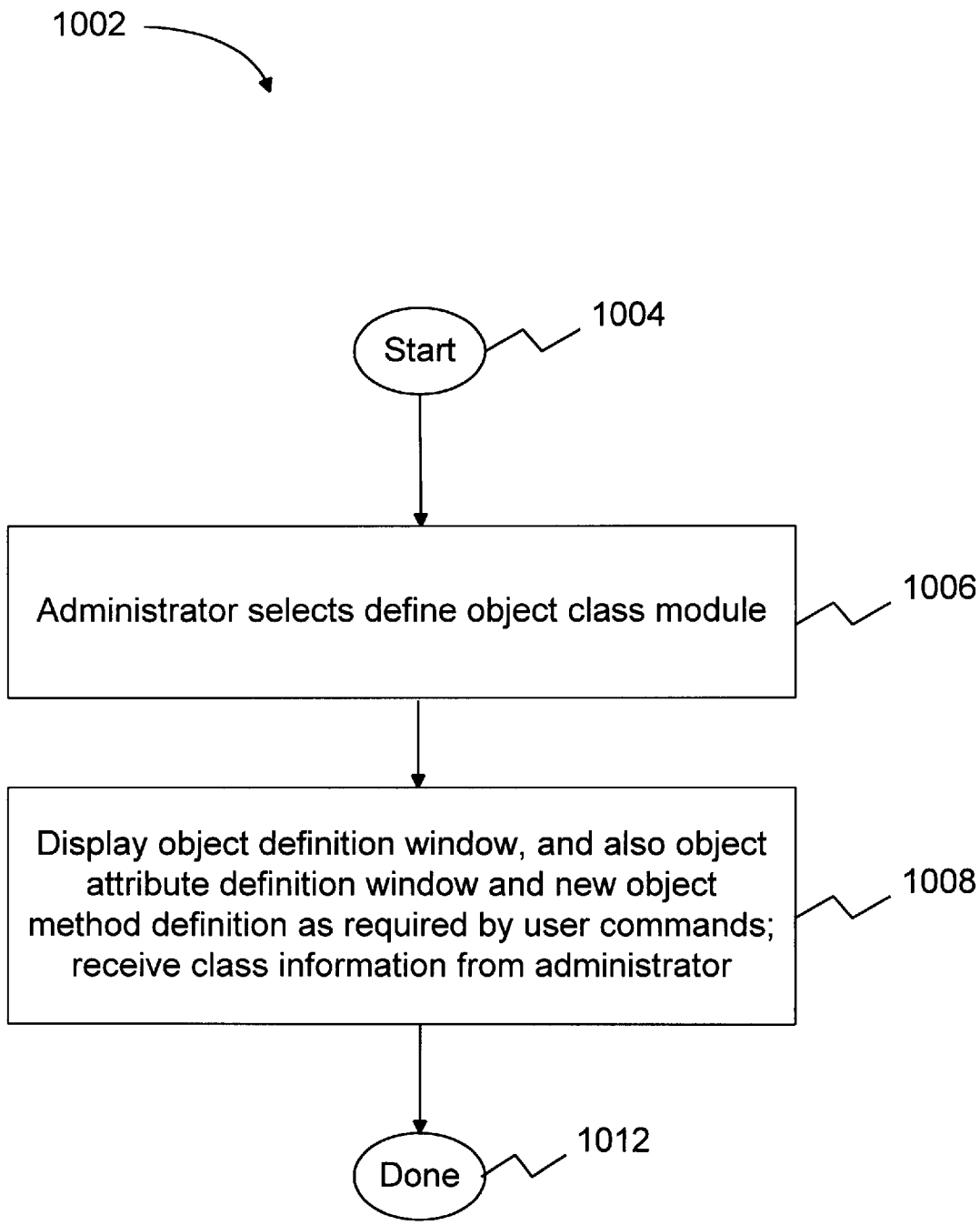

Step 906 shall now be described in greater detail with reference to a flowchart 1002 in FIG. 10, which depicts the manner in which a single object class for a system resource/component is defined. Flowchart 1002 is performed for each object class that the administrator 104 wishes to define. Flowchart 1002 begins with step 1004, where control immediately passes to step 1006.

In step 1006, the administrator 104 indicates that he wishes to interact with the define object class module 206. The administrator 104 preferably does this by invoking the define object class module 206 in any well known manner, such as by selecting (with a pointing device, for example) an icon corresponding to the define object class module 206. It is noted that the user interface functionality described in this paragraph (i.e., displaying the icon corresponding to the define object class module 206, and responding to an user command via a pointing device to invoke the define object class module 206) is provided by the supervisory control logic 112 in a well known manner.

Figure 11:
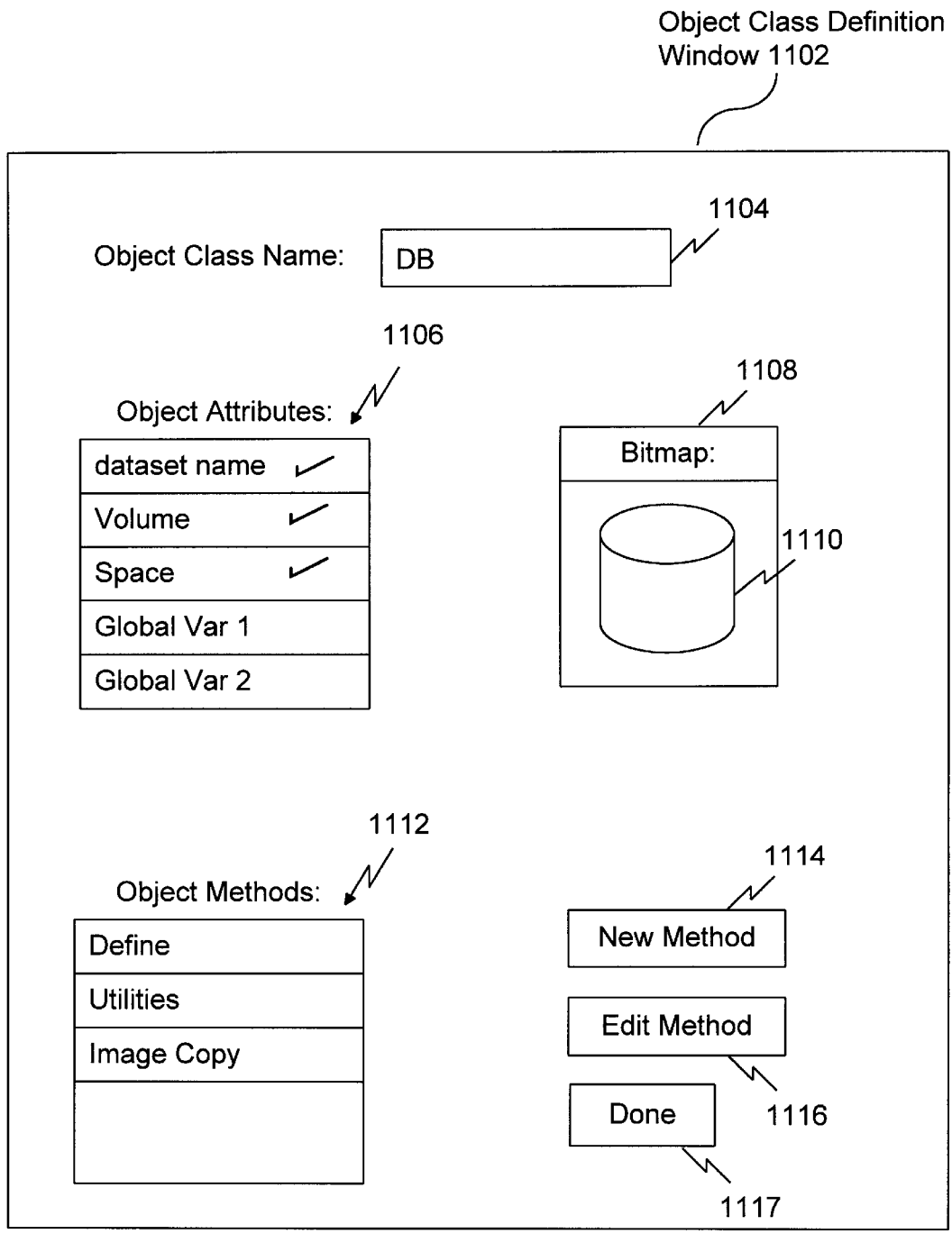

In step 1008, the define object class module 206 displays an object class definition window 1102 as shown in FIG. 11. The object class definition window 1102 includes an object class name field 1104 in which the administrator 104 can enter the name of the object class being defined, an object attributes field 1106 in which the administrator 104 can indicate which object attributes apply to the object class, a bitmap field 1108 in which the administrator 104 can select a bitmap (icon) to represent instantiations of the object class, an object methods field 112 that lists methods that apply to the object class, a new method button 1114 that the administrator 104 can press when he wishes to add a new method to the object methods field 112, an edit method button 1116 that the administrator 104 can press when he wishes to edit one of the methods in the object methods field 1112, and a done button 1117 that the administrator 104 can press when the object class has been completely defined.

Also in step 1008, the define object class module 206 receives from the administrator 104 object class definition information, and displays this information in the appropriate fields of the object class definition window 1102. In the example of FIG. 11, the object class being defined is called DB, as indicated in the object class name field 1104 (DB stands for database).

The administrator 104 has selected a bitmap 1110 that resembles a cylinder, as indicated in the bitmap field 1108.

The object attributes associated with object class DB are database name, volume, and space, as indicated by the check marks in the object attributes field 1106. This means that the system resources/components represented by the object class DB each has these three attributes.

In practice, the administrator 104 first identifies the attributes associated with the system resources/components in question (i.e., the system resources/components that are to be represented by the object class being defined). Then, the administrator 104 associates these attributes with the object class by selecting the corresponding entries in the object attributes field 1106.

The object attributes field 1106 lists all object attributes that are defined. If an attribute associated with the system resources/components does not have a corresponding entry in the object attributes field 1106, then the administrator 104 invokes the define object attribute module 210 (this is also part of step 1008). The define object attribute module 210 then displays an object attribute definition window 1202, as shown in FIG. 12.

The object attribute definition window 1202 includes an attribute name field 1204 in which the administrator 104 may enter the name of the attribute being defined, an object attribute check box 1206 where the administrator 104 can indicate whether this attribute is an object attribute, and a done button 1208 which the administrator 104 presses once the attribute has been completely defined.

Figure 12:
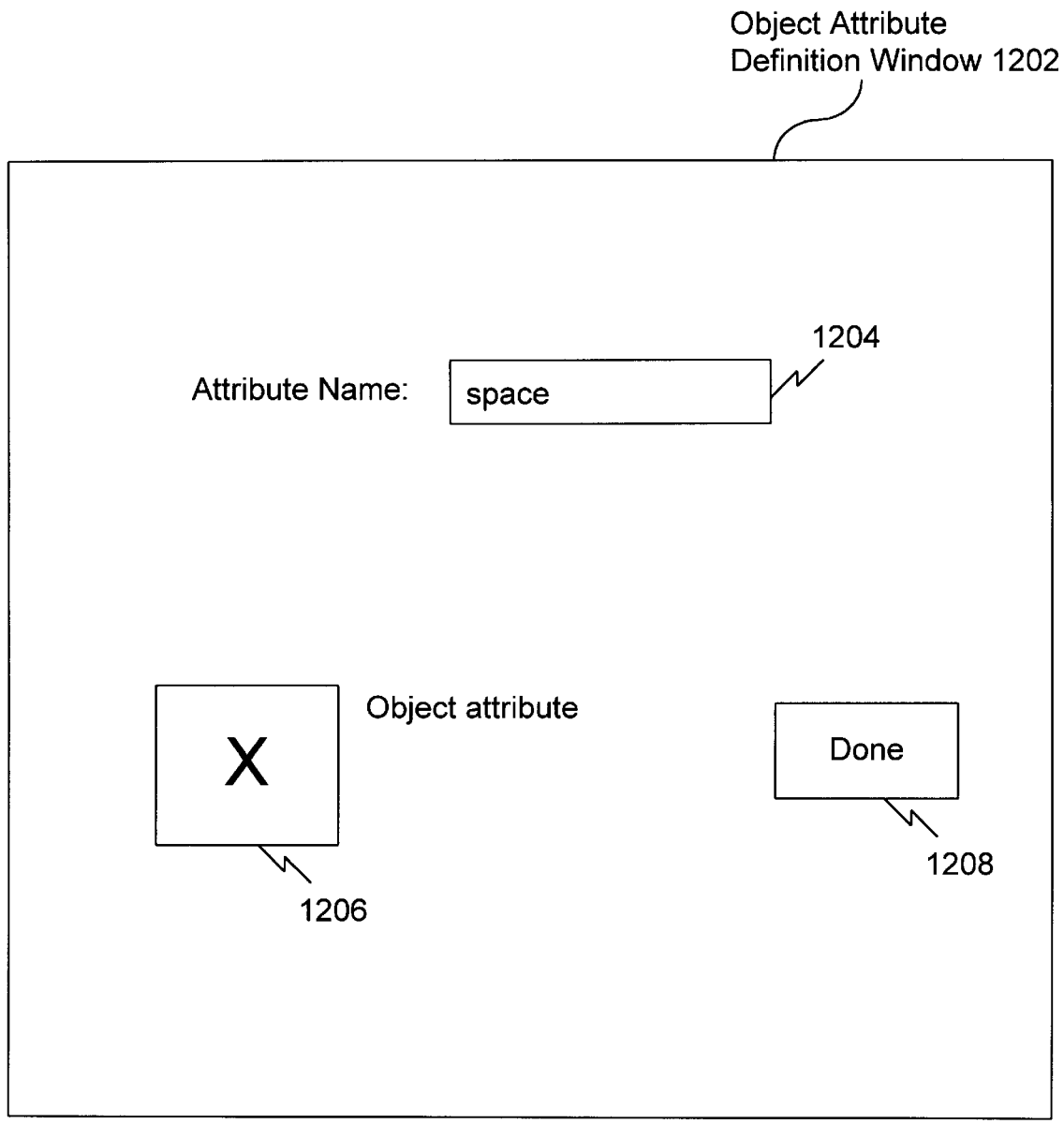

In the example of FIG. 12, the space attribute is being defined as indicated in the attribute name field 1204. This attribute is an object attribute, as indicated by the check in the object attribute check box 1206. If this box 1206 is not checked, then the attribute is a global variable (such as Global Var1 and Global Var2 in the object attributes field 1106 of FIG. 11), which is a variable that can be shared among multiple objects. After the administrator 104 presses the done button 1208, the attribute being defined (i.e., the space attribute) appears in the object attributes field 1106.

The object methods associated with the DB object class are define, utilities, and image copy. These methods are those that can be applied to instantiations (i.e., DB objects) of the DB object class. According to the present invention, an object method is a dialog. Thus, define, utilities, and image copy are dialogs that were previously defined by the administrator 104 in step 406 (FIG. 4). These dialogs can be applied to instantiations of the DB object class.

The administrator 104 associates a new method with the DB object class by pressing the new method button 1114 (this is also part of step 1008). This results in invoking the define new object method module 208.

Figure 13:
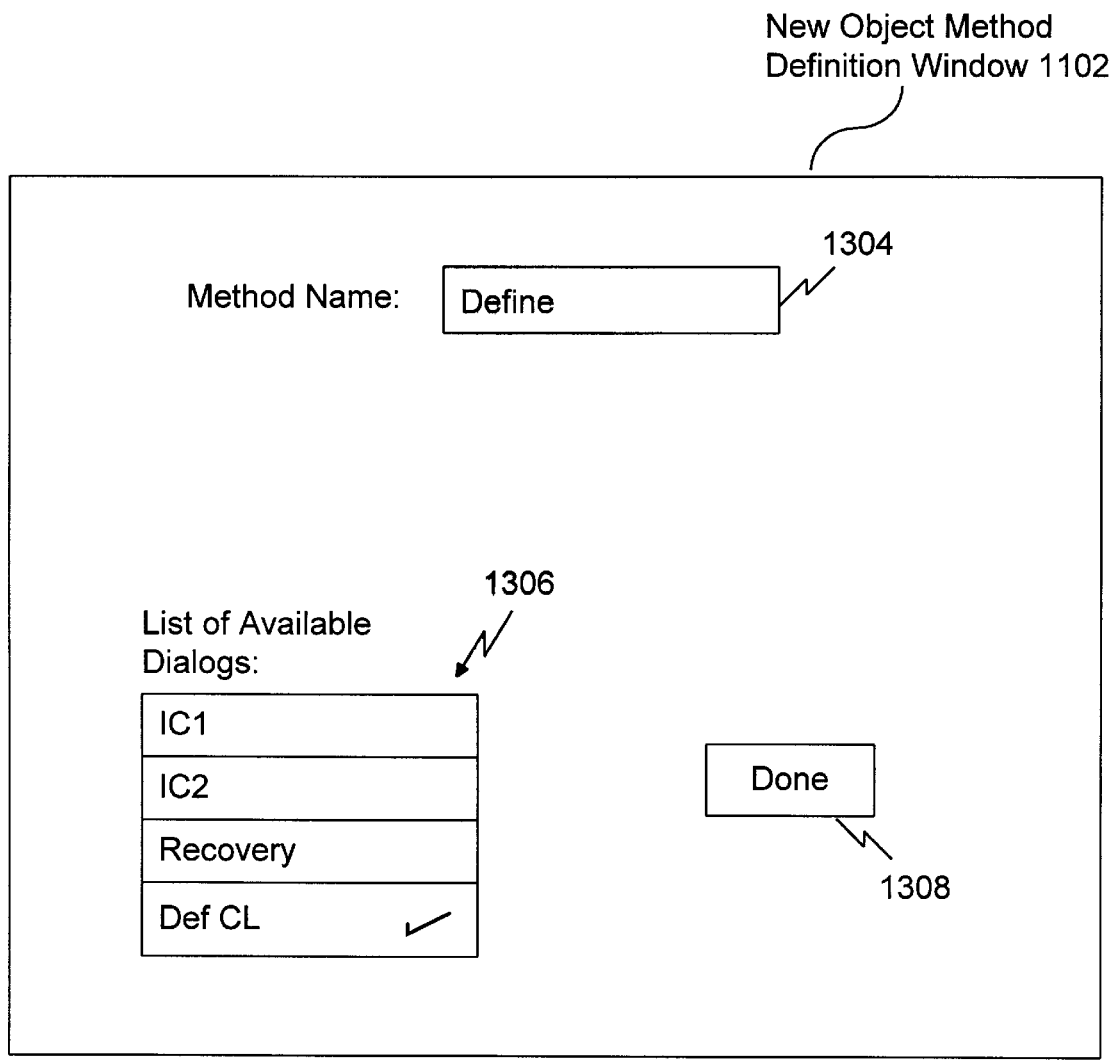

The define new object method module 208 displays a new object method definition window 1302, as shown in FIG. 13. The new object method definition window 1302 includes a method name field 1304 in which the administrator 104 can enter the name of the method being defined and associated with the object class, an available dialogs field 1306 in which the administrator 104 can select the dialog(s) to be associated with the method, and a done button 1308 that the administrator 104 can press once the new method has been defined.

In the example of FIG. 13, the define method is being defined, as indicated by the method name field 1304. The available dialogs field 1306 lists all dialogs presently defined (not all dialogs are shown in FIG. 13). The administrator 104 has indicated that dialog defc1 (associated with the define cluster command, as shown in FIG. 6) should be associated with the define method. This is indicated by the check mark in the available dialogs field 1306. If a required dialog has not yet been defined, then the administrator 104 must define the dialog in the manner described above.

If the administrator 104 wishes to edit a method listed in the object methods field 1112 (FIG. 11), then the administrator 104 presses the edit method button 1116. A window such as the new object method definition window 1302 is then displayed. The administrator 104 can then select and edit a method via this window.

The administrator 104 presses the done button 1117 once the object class has been defined. At that time, the object class definition information for the object class are stored, preferably as a record in a relational database.

Referring again to FIG. 9A, step 908 is performed after the administrator 104 has defined all desired object classes in step 906. Before describing step 908, however, it will be useful to revisit the definition of a dialog and a parameter as shown in FIGS. 6 and 7, respectively. As noted above, the invention allows a method (i.e., a dialog) to be applied against an object. To accomplish this, the invention provides a mechanism to link a dialog with an object. One part of this linkage is the object methods field 1112. The object methods field 1112 in the example of FIG. 11 indicates that the DB object class is associated with the define, utilities, and image copy methods. With respect to the define method, note that this method is represented by the defc1 dialog (FIG. 13). Thus, the DB object class is linked to the defc1 dialog.

The invention provides additional linkage between dialogs and objects. Referring to FIG. 6, note that the define cluster command has three parameters: &DS, &Vol, and &SP. FIG. 7 illustrates the definition of the &DS (Data Set Name) parameter. Note that this parameter is indicated in the object attributes field 708 as being a dataset name object attribute. In FIG. 11, note that the DB object class has as one of its object attributes the dataset name object attribute. Thus, the DB object class and the Data Set Name parameter (&DS) have in common the dataset name object attribute. Accordingly, the DB object class and the Data Set Name parameter are linked by the dataset name object attribute. In particular, when the defc1 dialog is invoked, values for the Data Set Name (&DS) parameter in the define cluster command are obtained from the dataset name attribute of instances of the DB object class (instead of being provided through execution time interaction with the user 110). This is further described below.

Referring again to FIGS. 9A and 9B, the user 110 performs steps 908–932 to construct a computer program 112 using dialogs and objects. Steps 908–932 shall now be described.

In step 908, the user 110 identifies a project or job that must be performed. The project may be to recover a database, or to perform an off-line edit, for example. The project may include one or more tasks. In steps 910–932, the user 110 uses the dialogs and objects to construct a computer program 112 to perform this project.

In step 910, the user 110 determines whether all objects (i.e., instantiations of object classes) needed to perform the project have been instantiated. The user 110 preferably performs step 910 by identifying all of the resources/components in the target system that are needed to perform the project. The user 110 then determines whether an object has been instantiated for each of these resources/components. If an object has been instantiated for each of these resources/components, then step 920 is performed (described below). Otherwise, steps 912–918 are performed, wherein an object is instantiated for each resource/component that does not already have an object.

Specifically, in step 912 the invention (preferably the supervisory control logic 314) displays a list of all object classes currently defined. The user 110 selects an object class that represents one of the resources/components that does not already have an object (this is called the "current resource/component" for reference purposes). For illustrative purposes, assume that the current resource/component is a database, and that the selected object class is the DB object class.

In step 914, the user 110 provides a name for the object (called the "new object" for reference purposes) which the user 110 wishes to instantiate to represent the current resource/component. For illustrative purposes, assume that the user 110 calls this new object "Payroll3."

Figure 14:
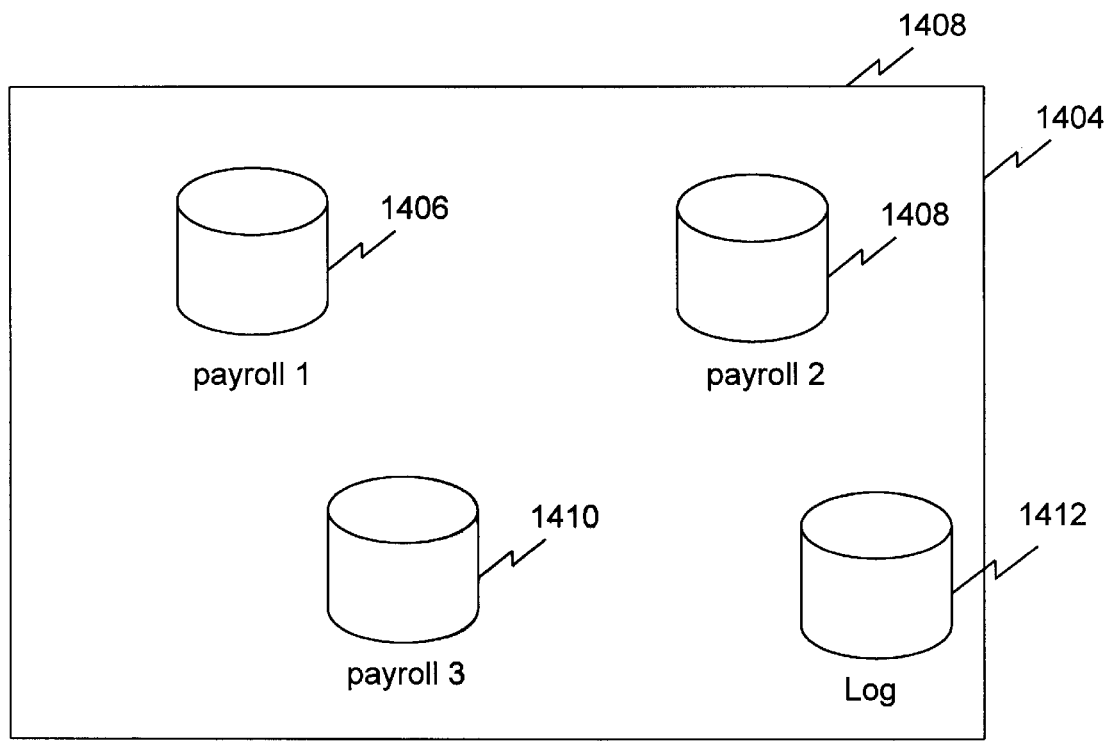
FIG. 14 illustrates an example display of bitmaps associated with objects.

In step 916, the invention (in particular, the supervisory control logic 314) displays the bitmap 1410 of object Payroll3. This is shown in FIG. 14. Note that objects Payroll1 and Payroll2 were previously created, and are also instantiations of the DB object class. The previously-created object called Log is an instantiation of a different object class.

Figure 15:
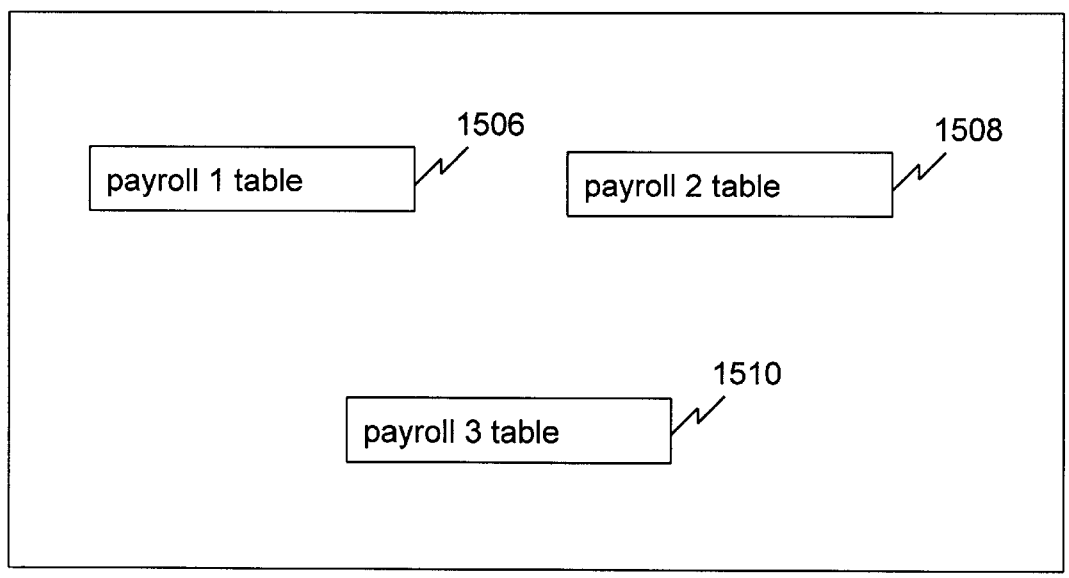
FIG. 15 illustrates attribute tables associated with the objects of FIG. 14.
Figure 16:
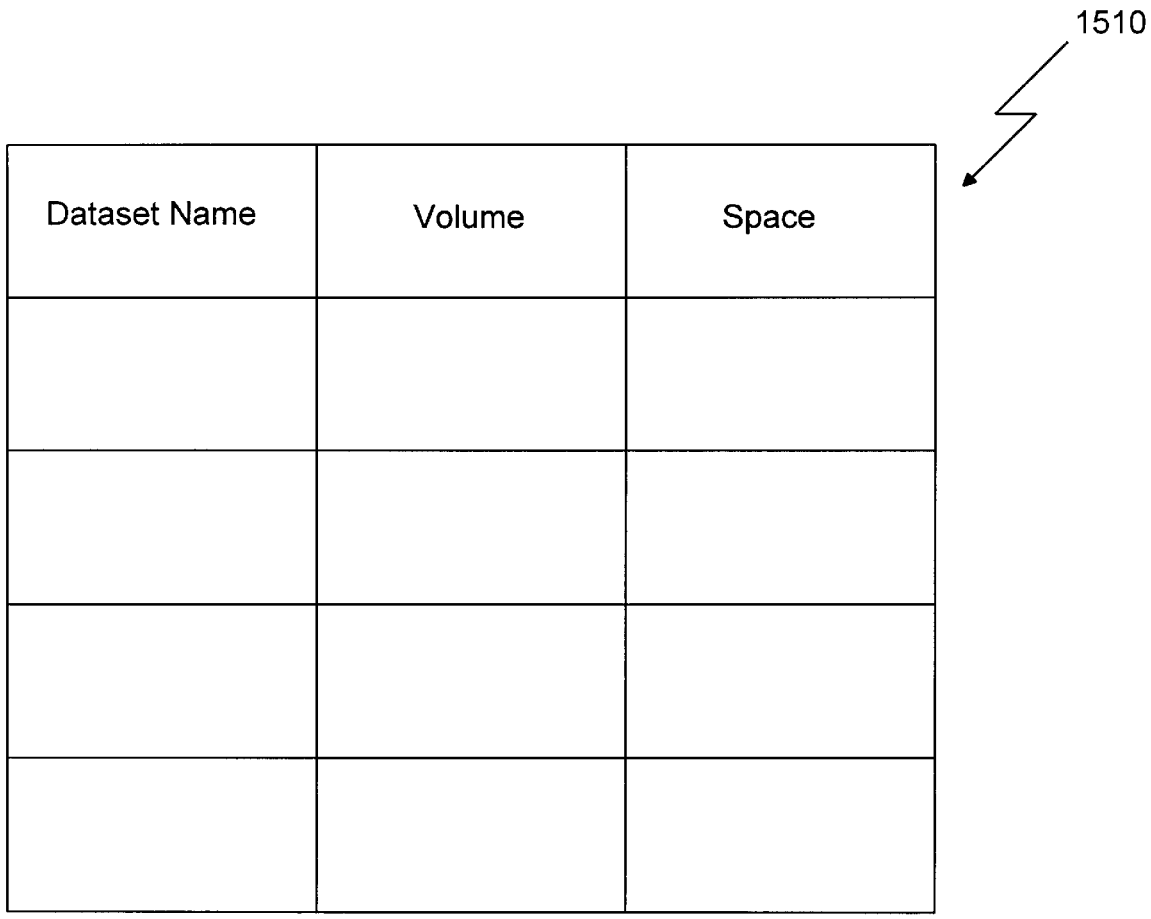
FIG. 16 illustrates an example attribute table.

In step 918, the user 110 requests that the attribute table associated with object Payroll3 be displayed. According to the invention, associated with each object is an attribute table (these are shown as attribute tables 312 in FIG. 3). See FIG. 15. The attribute table for an object includes a column for each object attribute of the object's object class. FIG. 16 illustrates the attribute table 1510 for the object Payroll3, which is displayed pursuant to the user's 110 request in step 918. This attribute table 1510 includes a dataset name column, a volume column, and a space column, corresponding to the object attributes of the DB object class (see FIG. 11).

As will be appreciated, a database includes one or more datasets. Recall that the current resource/component is a database. Thus, the attribute table 1510 includes a row for each dataset associated with the Payroll3 object (and ultimately associated with the current resource/component). In step 918, the user 110 enters attribute values for each dataset in the current resource/component. If the current resource/component has 1000 datasets, then the user 110 would create 1000 rows in the attribute table 1510, and the user 110 would enter the dataset name, volume, and space of each dataset in the row corresponding to that dataset.

Control then returns to step 910, as indicated by control line 919. As discussed above, in step 910 the user 110 determines whether all objects needed to perform the project have been instantiated. If all such objects have been instantiated, then step 920 is performed. Step 920 shall now be described.

In step 920, the user 110 selects in a well known manner all objects pertinent to the project. The user 110 may do this, for example, by using a mouse in a well known manner to select each such object. Assume for illustrative purposes that the user 110 selects Payroll1, Payroll2, and Payroll3.

In step 922, the user 110 requests a list of all methods associated with these selected objects. These objects are of class DB. Associated with class DB are the methods define, utilities, and image copy (see FIG. 11). Thus, pursuant to the user 110s request, a list specifying methods define, utilities, and image copy is displayed.

The user 110 then selects one of these methods. Assume, for illustrative purposes, that the user 110 selects the define method. In effect, the user 110 is requesting that the invention generate code that, when executed, will apply the define method against objects Payroll1, Payroll2, and Payroll3.

Figure 8:
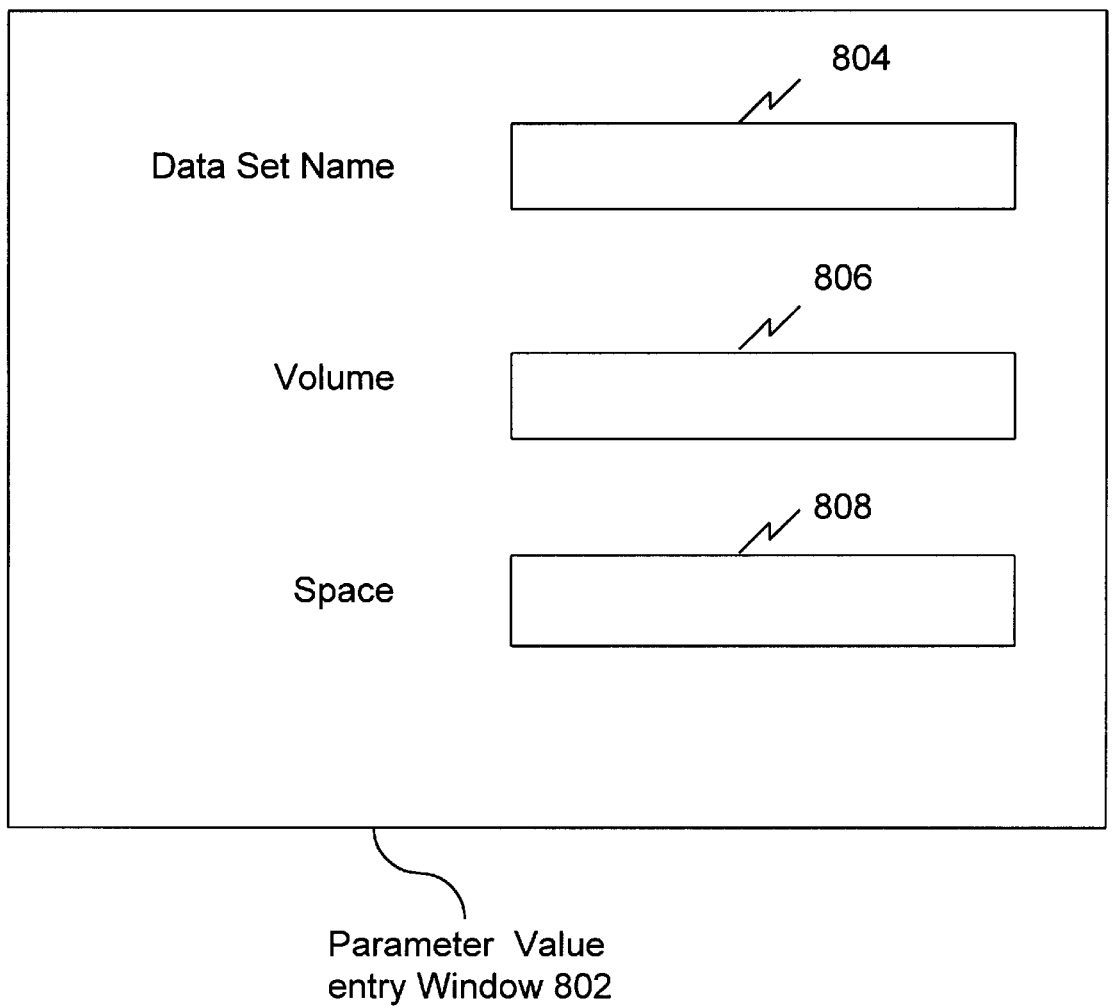

In step 924, the invention (in particular, the supervisory control logic 314) displays the parameter value entry window(s) for the selected method (recall that a method is a dialog). In this case, the parameter value entry window 802 shown in FIG. 8 is displayed. In this case, the user 110 need not enter any parameter value information, as this information will all be retrieved from the attribute tables associated with the objects Payroll1, Payroll2, and Payroll3. In some cases, however, there may be some parameters that will not be filled in using information from attribute tables. In such cases, the user 110 in step 924 supplies such parameter value information.

In step 926, the invention (in particular, the supervisory control logic 314) generates code so as to apply the selected method to the selected objects Payroll1, Payroll2, and Payroll3. The code is in the computer programming language of the computer program 112 being generated. Also, the code is in the proper format and syntax as defined and required by the computer programming language.

Figure 17:
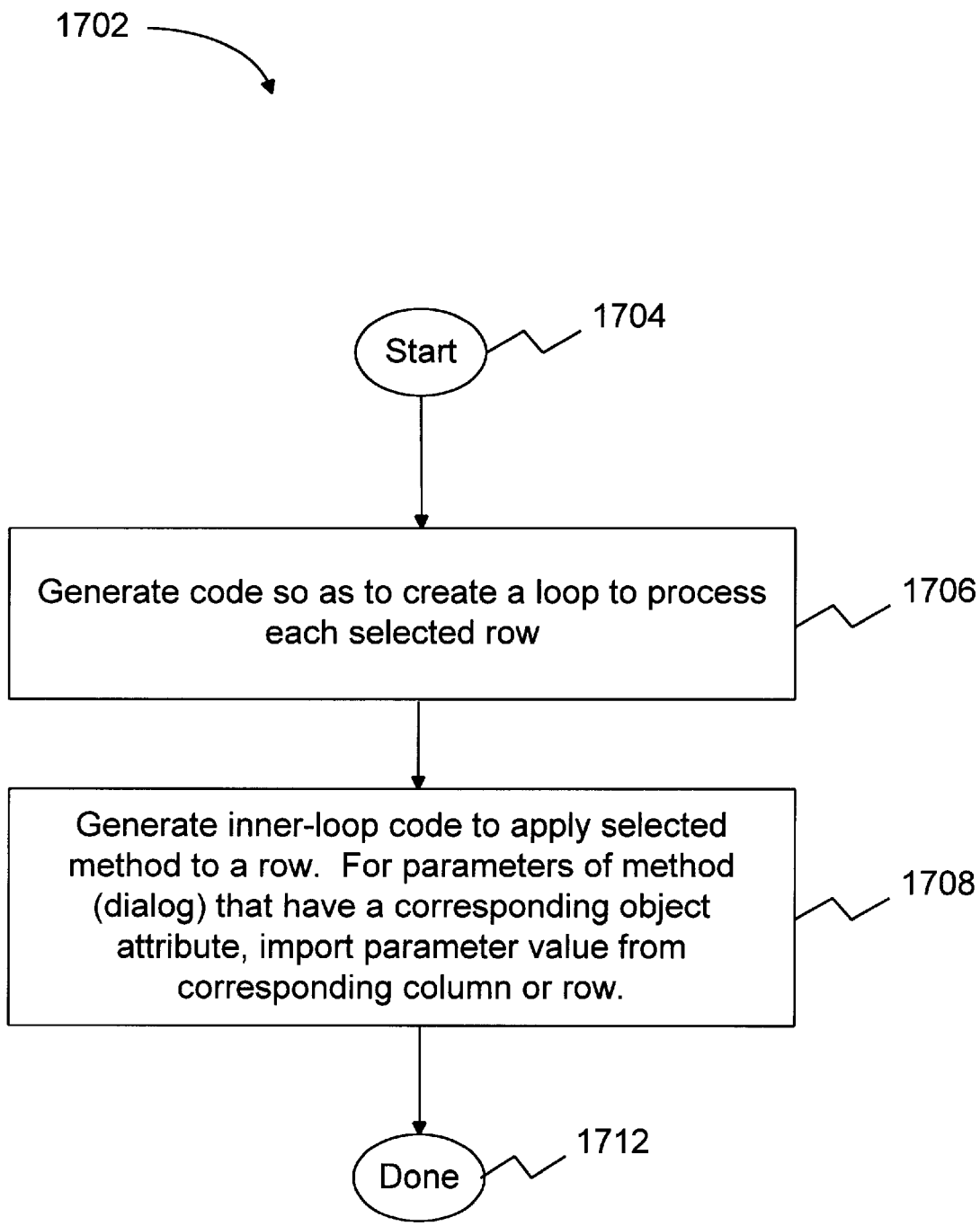

The manner in which step 926 is performed is shown in a flowchart 1702 in FIG. 17. Flowchart 1702 begins with step 1704, where control immediately flows to step 1706.

In step 1706, the invention generates code so as to process each row of the attribute tables 1506, 1508, 1510 associated with the selected objects Payroll1, Payroll2, and Payroll3. In another embodiment, the user 110 may select a subset of the rows from these attribute tables 1506, 1508, 1510, and the invention would then generate code so as to process each of these rows.

In step 1708, the invention generates inner-loop code to apply the selected method to a row. This code is generated such that values for parameters of the method are extracted from the row, where possible. Otherwise, parameter values entered by the user 110 in step 924 are used.

For example, the define method is implemented using the defc1 dialog (FIG. 13), which corresponds to the define cluster command (FIG. 6). The define cluster command has three parameters, &DS, &Vol, and &SP. The &DS parameter is a dataset name object attribute (FIG. 7) that is linked to the dataset name column in the attribute tables 1506, 1508, 1510 (FIG. 16). Also, the &Vol parameter is a volume object attribute that is linked to the volume column in the attribute tables 1506, 1508, 1510, and the &SP parameter is a space object attribute that is linked to the space column in the attribute tables 1506, 1508, 1510 (these links are not explicitly shown in the drawings). Thus, in step 1708 the invention generates the code such that values for the &DS, &Vol, and &SP parameters in the define cluster command are retrieved from the rows of the attribute tables 1506, 1508, 1510.

Flowchart 1702 is complete after step 1708 is performed, as indicated by step 1710.

Referring again to FIG. 9B, in step 928 the invention (preferably the supervisory control logic 314) adds the code to the computer program 112 being generated. In one embodiment, the invention appends the code to the computer program 112, although the user 110 may indicate other ways for inserting the code into the computer program 112.

In step 930, the user 110 determines whether the project identified in step 908 has been completely addressed by the computer program 112. If the project has not been completely addressed, then control flows back to step 922 to enable the user 110 to continue to generate the computer program 112 (alternatively, control flows along control line 411, which is described below). Otherwise, generation of the computer program 112 is complete, and flowchart 902 terminates, as indicated by step 932.

Note that all of the selected objects in the above description were of the same object class. The present invention also supports the application of a method to objects of different classes. In this case, the selected dialog includes in its representation another dialog (using a Dialog type parameter). The selected dialog operates to process objects of one class. The other dialog operates to process objects of another class. This approach can be readily extended to process objects of more than two classes.

Figure 9A:
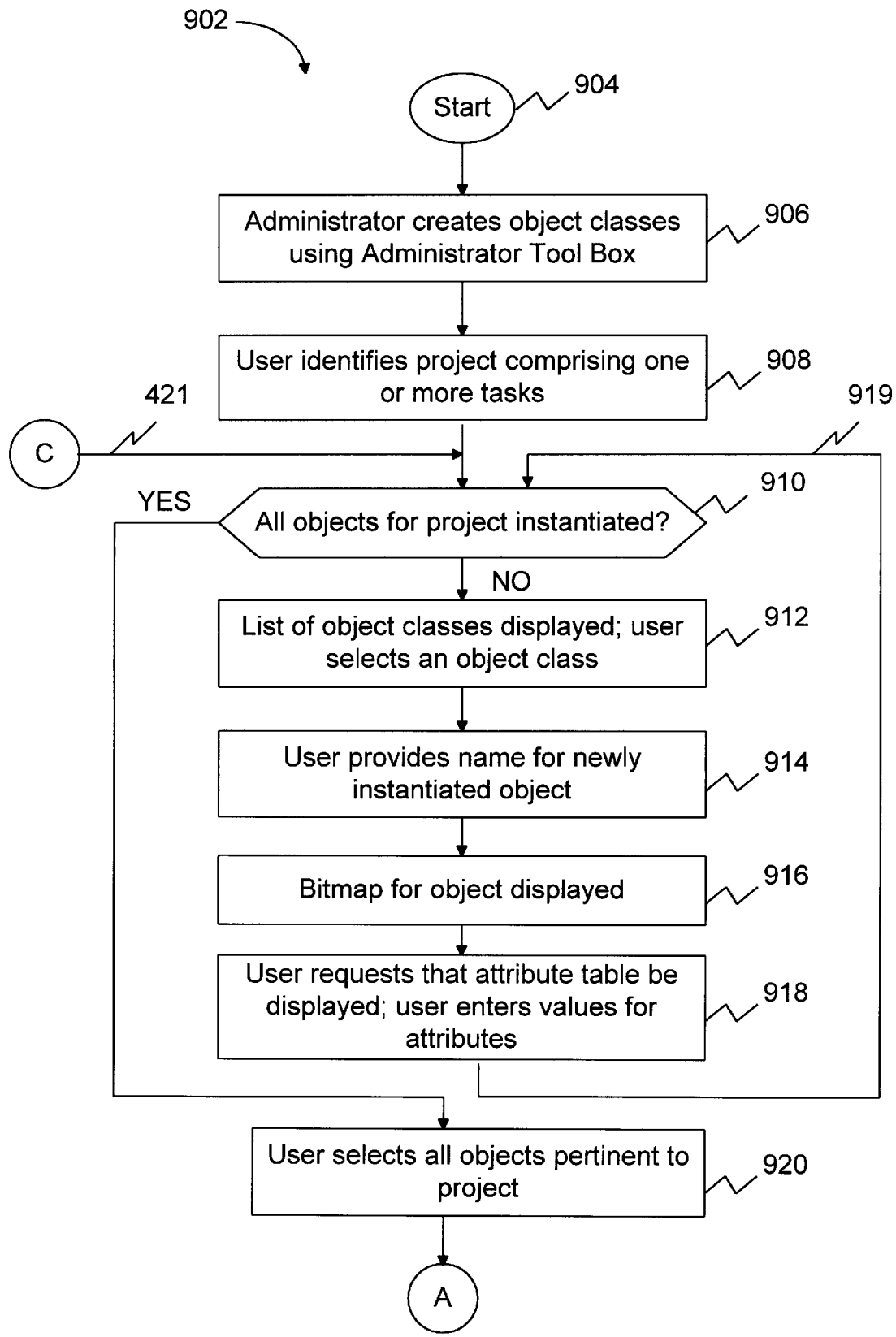
Figure 9B:
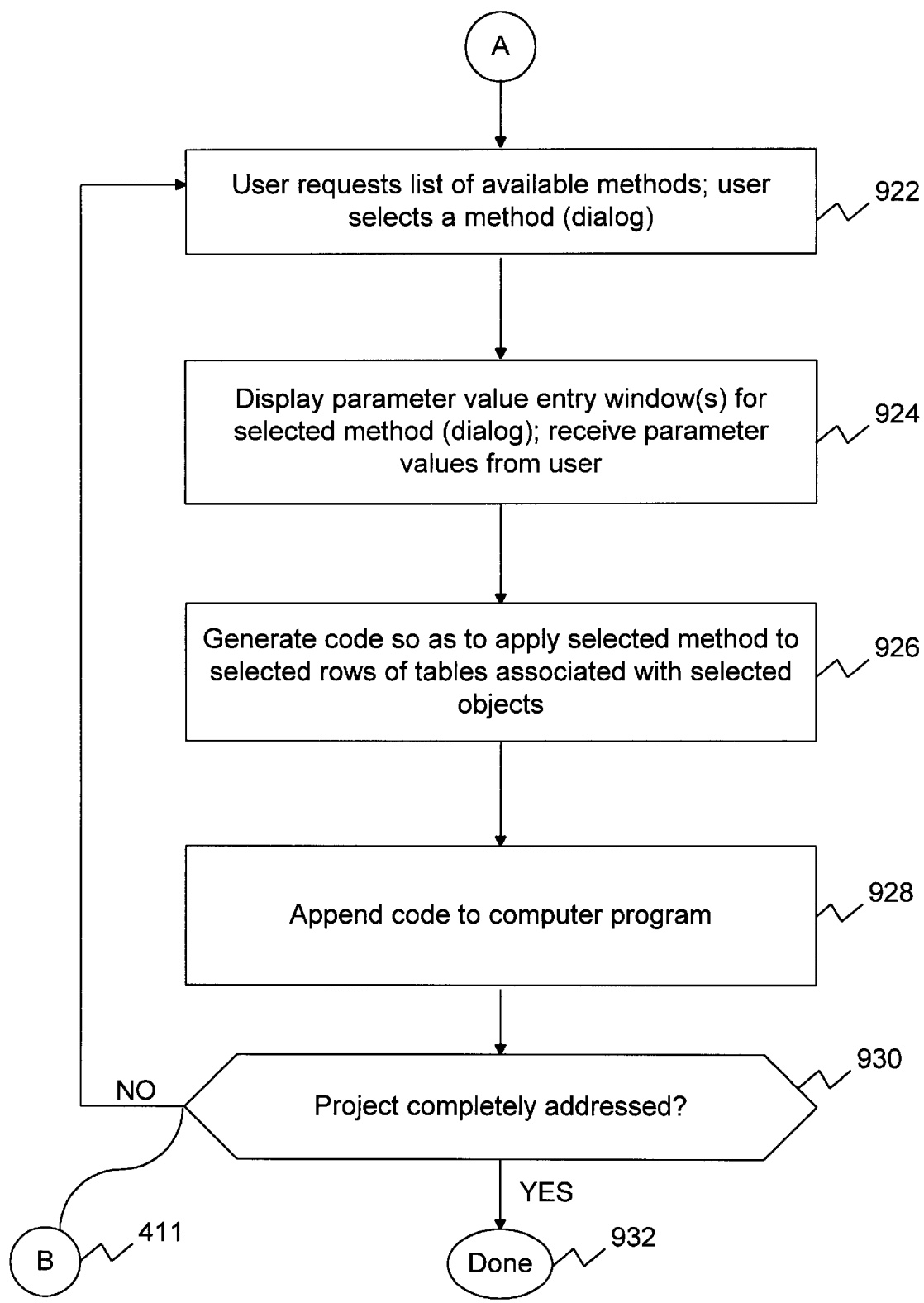

According to the invention, the user 110 may use either the dialogs alone to generate computer programs 112 (as described above with reference to FIG. 4), the dialogs applied to objects to generate computer programs 112 (as described above with reference to FIGS. 9A and 9B), or any combination of these. The interaction between flowcharts 402 and 902 in FIGS. 4, 9A, and 9B are indicated by control lines 411 and 421, although other connectivity between flowcharts 402 and 902, so as to provide users 110 will additional flexibility with using dialogs and objects to create computer programs 112, will be apparent to persons skilled in the relevant art(s).

It should be understood that, while in the above description some functions were described as being performed by an user, and others by an administrator, in practice any step can be performed by an administrator or an user, or by both. Accordingly, users and administrators are collectively referred to as operators herein.

3. Object Representation of Program Components

According to the present invention, program components are represented by objects, as defined and discussed above. In one embodiment, a graphical user interface is applied to a program that is developed using the dialogs described above. More generally, the object representation of the present invention is applied to any program that may be built and/or displayed in a modular form. The following description illustrates the development of programs through the manipulation of object representations of dialog generated program components. As described above, the dialogs themselves are graphical user interfaces for command syntaxes and reusable program templates.

Figure 18:
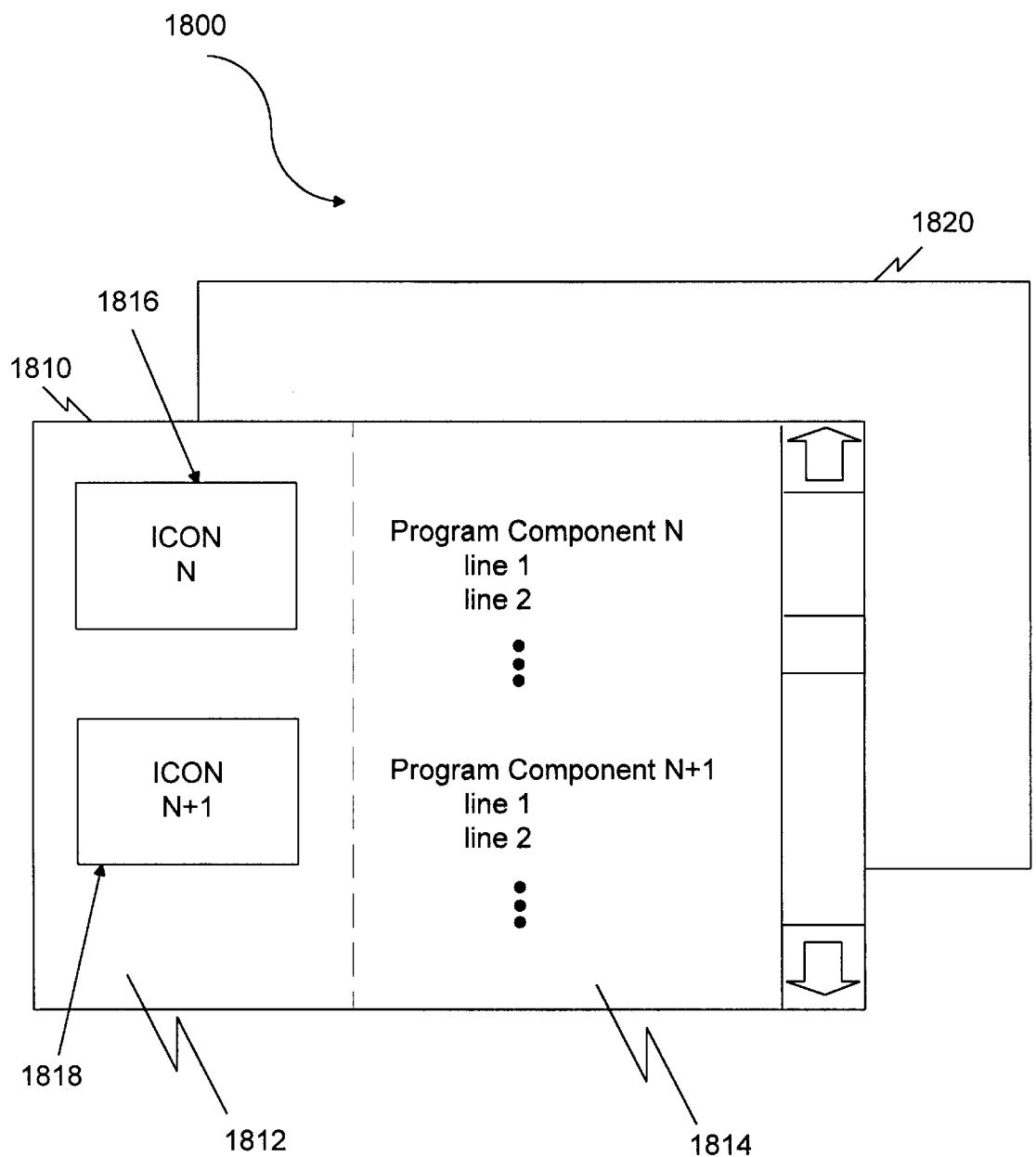
FIG. 18 illustrates a graphical user interface having object and textual program component representations.

FIG. 18 illustrates a graphical user interface 1800 that displays program components using both object and textual representations. Graphical user interface 1800 may include multiple windows 1810, 1820, each window representing a single program. Each window 1810, 1820 further comprises a scrollable table that includes a plurality of rows 1816, 1818. Each of the plurality of rows 1816, 1818 is dedicated to a single program component. In a preferred embodiment, a single row 1816, 1818 comprises a particular invocation of a dialog. Generally, the ordering of rows 1816, 1818 corresponds to the ordering of components in the program.

As FIG. 18 further illustrates, each row 1816, 1818 in a window 1810, 1820 comprises two columns 1812 and 1814. Column 1812 includes an object representation (or icon) of a particular program component. The icon representation graphically conveys the function and meaning of the program component that it represents. In this manner, the icons not only give an object representation for each program component, but also provides a visual flow representation of the program.

Column 1814, on the other hand, provides a textual representation of each of the program components. In this textual representation, a single program component or row 1816, 1818 in a window 1810, 1820 can contain several lines of text. In a preferred embodiment, the lines of text associated with a single program component corresponds to the lines of program code generated for a particular dialog invocation. More generally, however, the displayed lines of text may contain any generic description of a particular program component. This generic description is operative on any functional level. For example, the textual description may include actual program code, pseudo-code or a user-generated functional description. In a further embodiment, a single row may include multiple columns dedicated to varying levels of textual description of a program component.

In operation, graphical user interface 1800 provides a user with an efficient means for recognizing the relation of program components to the overall flow while retaining the editing capabilities of literal program code displays. In effect, graphical user interface 1800 of the present invention operates between the two conventional regimes of program building/editing that utilize either icons or text alone.

Generally, the present invention retains the cut/copy/paste editing features of traditional text editing systems. At one level, the user may select one or more rows 1816, 1818 from a first program and move the selected rows 1816, 1818 (or program components) to another part of the program, thereby altering the order of program execution. Alternatively, the user may copy one or more rows 1816, 1818 from a first program and add the selected rows 1816, 1818 to a second program (i.e., copy from a first window 1810 to a second window 1820). These features represent the traditional appeal of pure object oriented programming wherein program components or icons themselves are manipulated exclusively.

At a second level, graphical user interface 1800 also permits a user to edit the actual program code associated with an icon (or program component). This textual editing is accomplished in a variety of forms. In a first method, the text in a single row 1816, 1818 in a program or window 1810, 1820 is edited by altering the invocation of a particular dialog. The process of changing a dialog invocation is initiated by double clicking on a particular row 1816, 1818 in window 1810, 1820. This user action causes the parameter value entry window 802 corresponding to that particularly row to appear. In this manner, the user is able to edit the attributes of the dialog, thereby indirectly editing the generated program code.

Figure 19:
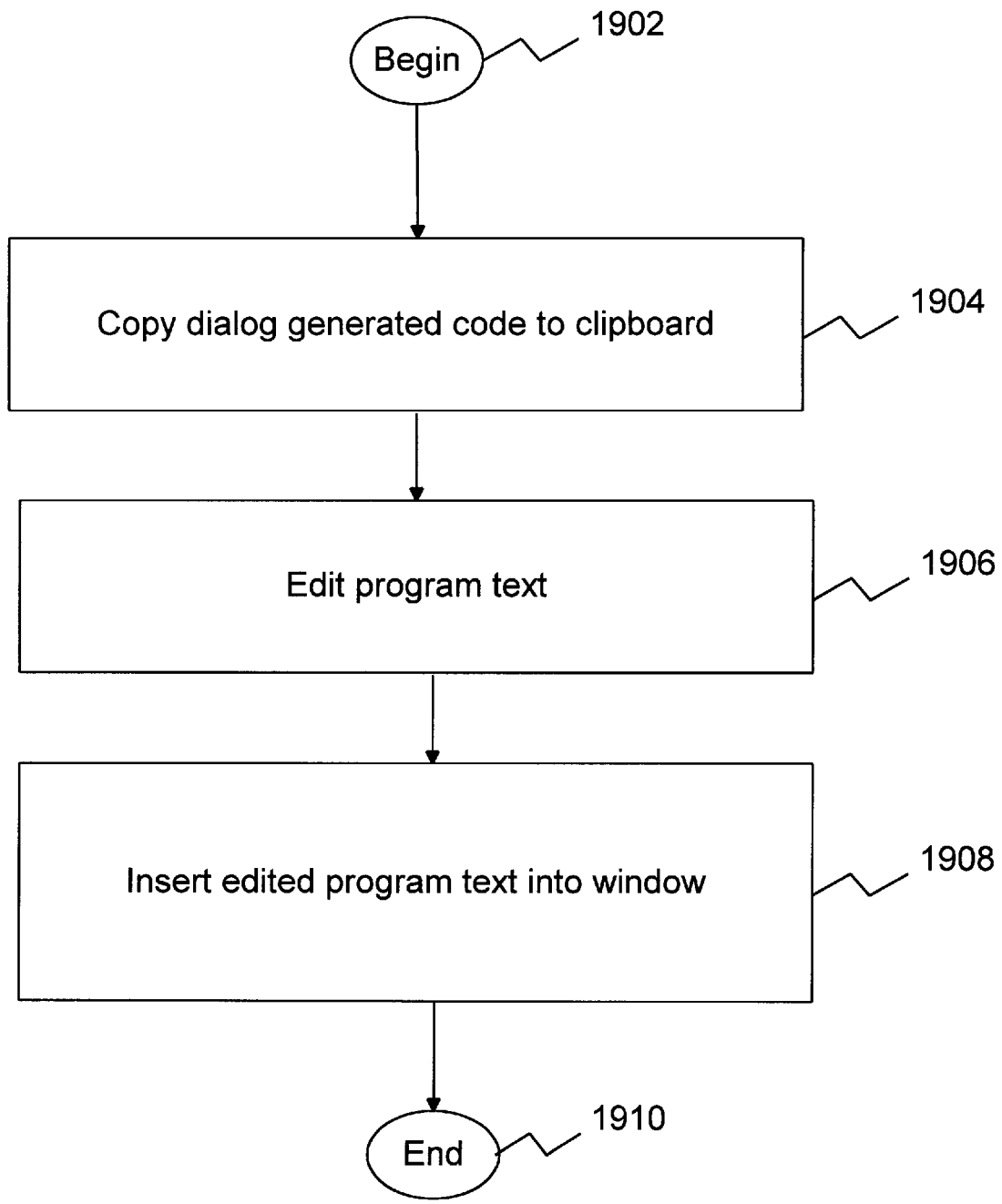

Additionally, the user is also able to directly edit the program code. In this manner, the user may choose to directly insert lines of hard-coded text into column 1814. This editing function is desirable since some syntax may not be represented by dialogs. In one embodiment, the text editing process comprises the steps of FIG. 19. This process begins in step 1902 where control is immediately passed to step 1904. In step 1904, the dialog generated text is copied to a computer clipboard. In step 1906, a user edits the program code in the clipboard. Finally, in step 1908, the edited program code is inserted back into window 1810, 1820.

Through this editing process, the user retains maximum flexibility in building and editing a program.

Significantly, the user is able to control the program flow through manipulation of high level representations (i.e., iconic) as well as low-level representations (i.e., literal program code) simultaneously. Additionally, at the textual level, the user manipulates program parameters that are represented by user-defined character strings. This feature of the present invention further enhances user recognition of the parameters within the program code thereby increasing the efficiency of the program building/editing process.

In conventional object oriented systems, the parameters within the generated program code are embedded within the particular program language. There is limited user control of the identification of these parameters. Accordingly, even if these systems allowed simultaneous manipulation of both iconic and textual procedure representations, a user would have to interpret program-defined rather than user-defined parameter representations.

Figure 20:
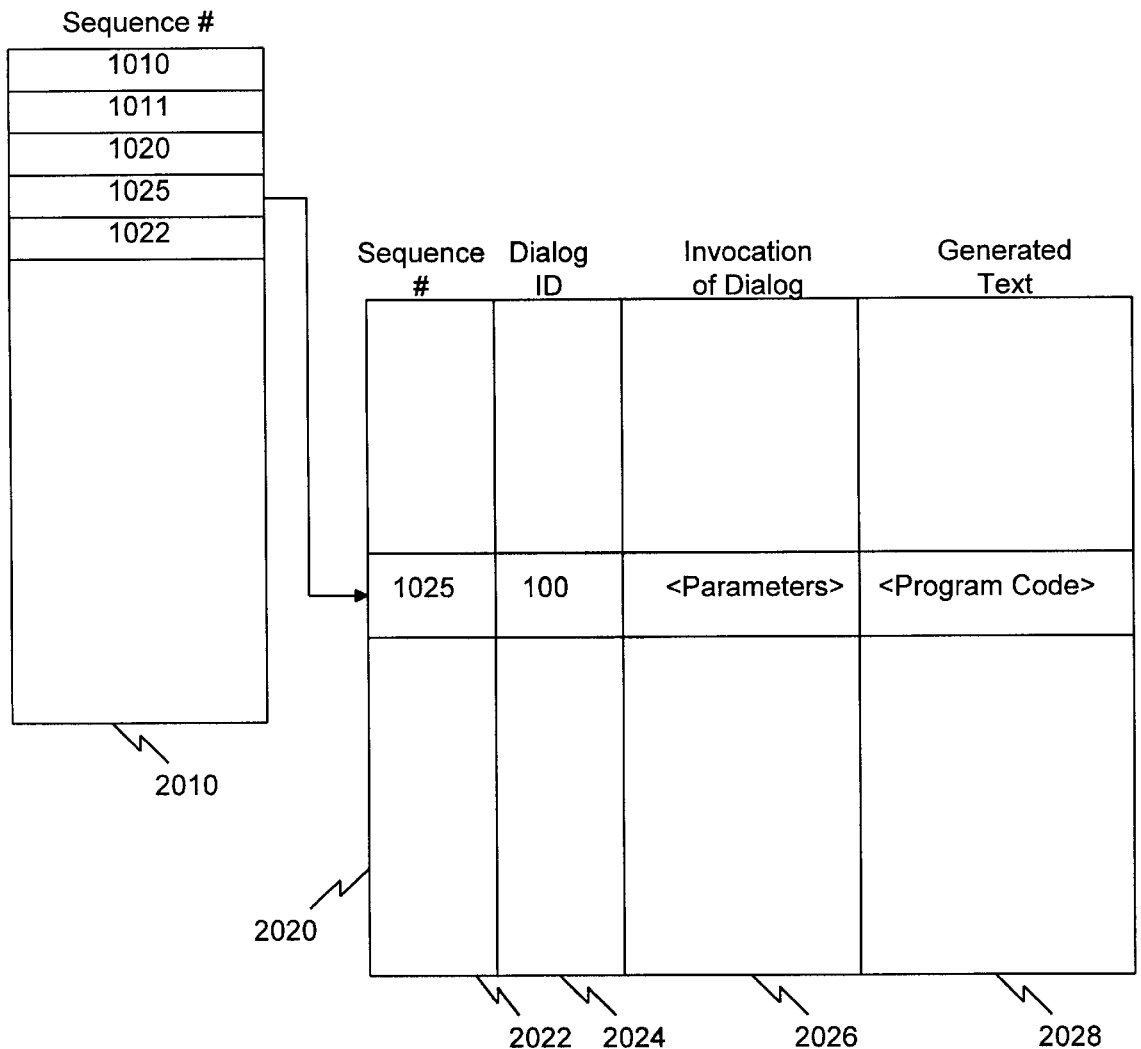
FIG. 20 illustrates the data structures used to implement the present invention.

In a preferred embodiment, each program in window 1810, 1820 is generated based on the two relational tables 2010, 2020 illustrated in FIG. 20. As would be apparent to one of ordinary skill in the relevant art, relational tables 2010, 2020 may also exist as flat files.

Generally, table 2010 maintains the sequence number of program components as they exist in program order. Thus, when a user rearranges the order of program components within a single program, the entries in table 2010 are similarly rearranged. The entries in table 2010 provide an index into table 2020. Each row in table 2020 stores a particular invocation of a dialog.

As further illustrated in FIG. 20, each row in table 2020 comprises information fields 2022, 2024, 2026 and 2028. Information field 2022 contains the sequence number that is indexed by table 2010. Information field 2024 contains the dialog ID for that program component. The dialog ID is an index into a dialog database that contains the entire catalog or listing of dialogs that is available to the user. The dialog ID also provides a means for identifying an appropriate icon for display in column 1812 in window 1810, 1820. In one embodiment, the icon information is stored in the same dialog database that contains the catalog or listing of dialogs.

Significantly, dialog ID field 2024 also provides a means for program editing and maintenance. The maintenance aspect of the present invention will be described in greater detail in the next section. In the editing process, a user double clicks on a particular row or icon. This action causes parameter value entry window 802 to appear. The generic parameter value entry window 802 for that program component is identified by dialog ID field 2024. The previously defined invocation of that dialog is identified by information field 2026.

Figure 21:
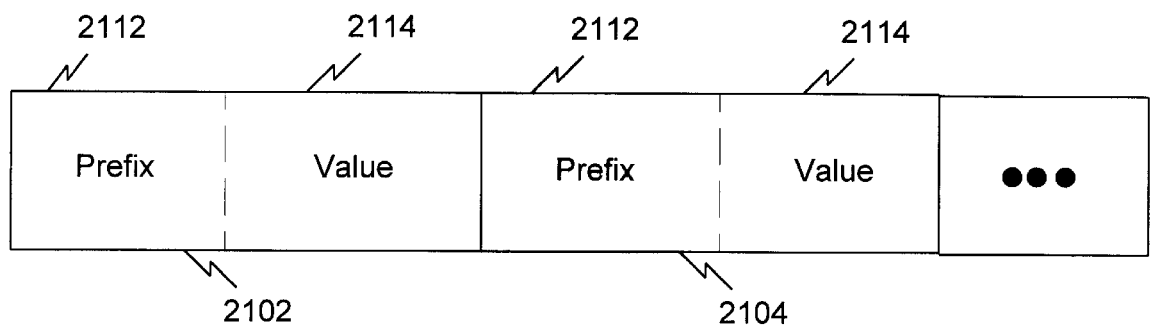
FIG. 21 illustrates the data structure containing parameter definitions.

In a preferred embodiment, information field 2026 is a text field that contains, in the order defined by the dialog definition, the listing of parameters defined by the user in parameter value entry window 802. The format of text field 2026 is illustrated in FIG. 21. Text field 2026 further comprises parameter definitions 2102, 2104. Each parameter definition 2102, 2104 includes a prefix field 2112 and value field 2114. Prefix field 2112 contains information about the parameter name, field type, length of value, etc. Value field 2114 contains the selected value or description. If a dialog invocation has an embedded dialog invocation, then value field 2114 contains the sequence number of the dialog to be invoked.

In a preferred embodiment, table 2020 further comprises information field 2028. Information field 2028 is a text field that contains the generated program code for a dialog with user-defined parameters entered in parameter value entry window 802. This text field is included primarily for speed and central maintenance. The central maintenance feature is described in more detail in the following section. In terms of speed, the inclusion of the generated program code in field 2028 allows the system to generate column 1814 without recomputing each dialog when a program is opened.

4. Central Maintenance for Programs

In a database test and maintenance system, thousands of system control programs may exist. If functional changes occur due to enhancements to the system hardware or software, existing system control programs may be invalidated. Updating these invalidated system programs to reflect the changes to the system is a complex and time consuming task.

The present invention provides a central point of maintenance for making changes to system programs developed by dialogs. In making a system change, the changes are applied to the appropriate dialog definitions that are stored in memory 308. Thus, when a system program defined by tables 2010 and 2020 is regenerated, the changes to the appropriate dialog definitions are incorporated into the newly generated program code. By this process, user interaction with the textual representation of the program code is minimized.

Figure 22:
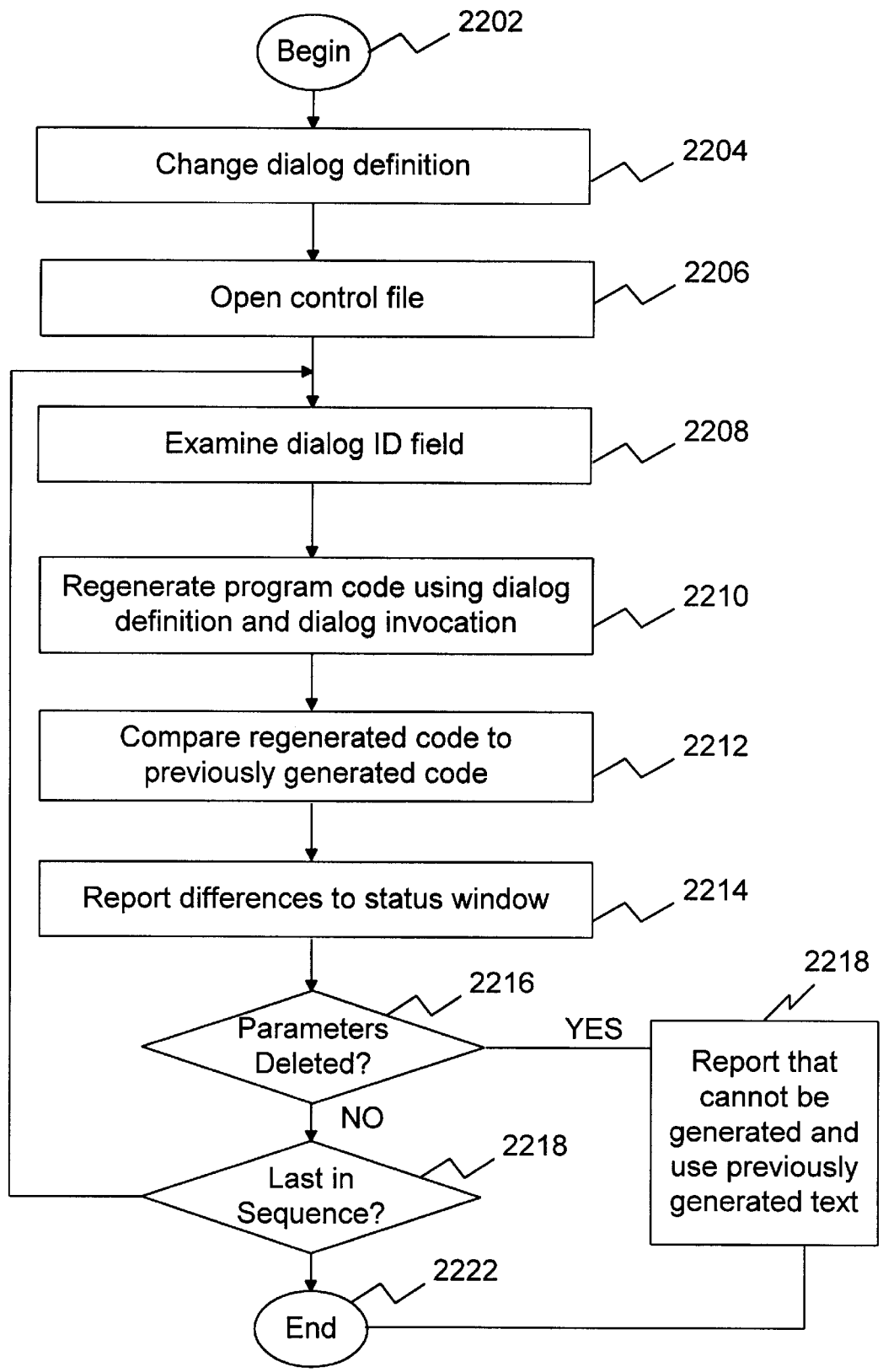

In describing the regeneration process, reference is made to FIGS. 20 and 22. In the flow chart of FIG. 22, tables 2010 and 2020 are referred to collectively as a control file.

The regeneration process begins in step 2202 where control is immediately passed to step 2204. In step 2204, a user updates a dialog definition that is referenced by the control file. This action represents the central point of maintenance and is accomplished through the interaction with dialog definition window 602. At step 2206, the control file is opened in order to access the program sequence and dialog invocations of tables 2010 and 2020.

In step 2208, the dialog ID field 2024 of the first program component is examined. This program component is identified through the sequence index provided by table 2010. In step 2210, the program code for the first program component is regenerated by applying the parameter definitions in dialog invocation field 2026 to the dialog definition referenced by the value of dialog ID field 2024.

Next, in step 2212, the regenerated code is compared to the previously generated code that is stored in text field 2028. If the central maintenance action has produced changes in the dialog definition, the code segments will be different. In step 2214, all differences are reported to a status window. If these differences represent minor changes to the dialog definition (e.g., change in a value of a constant) then the regeneration process for that program segment is completed and the regenerated code replaces the old program code in text field 2028. However, if step 2216 determines that a major change has occurred, for example, that a parameter was deleted from the dialog definition, then the system assumes that an inadvertent error has occurred. Other changes may constitute major changes. Such changes are user defined and are implementation dependent. What constitutes a major change could be stored in a table. Reference is made to this table in step 2216.

The process then continues in step 2218 where the old program code in text field 2028 is retained in place of the newly regenerated code. In this manner, working program code is not replaced by newly generated code that is presumptively incorrect. In a further embodiment, the user is queried to verify any substantial changes and is given the option to correct (or leave unchanged) the newly generated program code prior to replacement of the old program code.

Finally, in step 2220, it is determined whether the program component is the last in the sequence of components defined by table 2010. If more components require regeneration, the process repeats at step 2208.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for generating a graphical user interface for editing program code, comprising:

means for generating a scrollable table that contains a plurality of rows, each of said plurality of rows containing at least one program component;

means for placing one or more icons in a first column in at least one of said plurality of rows in said scrollable table, wherein an icon in a particular row provides an object representation for said at least one program component in said particular row; and means for placing generated program code for said program components in a second column of said scrollable table, wherein the ordering of said plurality of rows in said scrollable table corresponds to the ordering of said program components in said computer program;

wherein said generated program code is generated through user interactions with command and template dialogs, said dialogs being associated with commands from a computer programming language, each of said commands being in a form and having a syntax defined by said computer programming language.

2. The system of claim 1, wherein program parameters, if any, in said generated program code are represented by user-defined character strings.

3. The system of claim 2, wherein each of said program parameters has a parameter type, wherein said parameter type is at least one of:

(1) a required parameter;

(2) a user parameter;

(3) a fixed value parameter;

(4) a multiselect parameter;

(5) a conditional parameter; and (6) a non-required parameter.

4. The system of claim 1, further comprising means for placing additional descriptive text in at least one additional column of said scrollable table, wherein said additional descriptive text in a particular row provides a textual description of a function of the program component.

5. In a data processing system, a graphical user interface component for editing program code, comprising:

a scrollable table that contains a plurality of rows, each of said plurality of rows containing at least one program component;

one or more icons positioned in a first column in at least one of said plurality of rows in said scrollable table, wherein an icon in a particular row provides an object representation for said at least one program component in said particular row; and positioned generated program code for said program components in a second column of said scrollable table, wherein the ordering of said plurality of rows in said scrollable table corresponds to the ordering of said program components in said computer program;

wherein said generated program code is generated through user interactions with command and template dialogs, said dialogs being associated with commands from a computer programming language, each of said commands being in a form and having a syntax defined by said computer programming language.

6. The system of claim 5, wherein program parameters, if any, in said positioned generated program code are represented by user-defined character strings.

7. The system of claim 6, wherein each of said program parameters has a parameter type, wherein said parameter type is at least one of:
   (1) a required parameter;
   (2) a user parameter;
   (3) a fixed value parameter;
   (4) a multiselect parameter;
   (5) a conditional parameter; and
   (6) a non-required parameter.

8. The system of claim 5, further comprising additional descriptive text in at least one additional column of said scrollable table, wherein said additional descriptive text in a particular row provides a textual description of a function of the program component.

9. A method of object oriented programming, comprising the steps of:
   (1) generating program code for a plurality of program components by selectively invoking a plurality of dialogs;
   (2) associating an icon with at least one of said plurality of program components;
   (3) displaying, in a scrollable table, said plurality of program components, wherein each of said program components forms a row in said scrollable table that comprises at least one of an icon and said generated program code, wherein the ordering of said plurality of rows in said scrollable table corresponds to the ordering of said program components in said computer program;
   wherein said generated program code is generated through user interactions with command and template dialogs, said dialogs being associated with commands from a computer programming language, each of said commands being in a form and having a syntax defined by said computer programming language.

10. The method of claim 9, wherein step (3) further comprises the step of displaying generated program code that includes program parameters, if any, that are represented by user-defined character strings.

11. The method of claim 1, wherein each of said program parameters has a parameter type, wherein said parameter type is at least one of:
   (1) a required parameter;
   (2) a user parameter;
   (3) a fixed value parameter;
   (4) a multiselect parameter;
   (5) a conditional parameter; and
   (6) a non-required parameter.

12. The method of claim 9, further comprising the step of:
   (4) manipulating the order of said plurality of program components associated with one or more programs through cut/copy/paste operations.

13. The method of claim 9, further comprising the step of:
   (4) invoking a parameter value entry window to edit the generated program code associated with a selected program component.

14. The method of claim 9, further comprising the step of:
   (4) directly editing the generated program code in said second column of said scrollable window.

15. A method of generating a graphical user interface for object oriented programming, comprising the steps of:
   (1) defining a sequence of invocations of a plurality of dialogs for the performance of one or more tasks, wherein each of said invocations is further defined by a parameter list that includes at least one parameter definition;
   (2) generating program code for each program component, based on said invocations of said plurality of dialogs, in the format and syntax of a computer programming language;
   (3) storing, in a first table, an index representing said sequence;
   (4) storing, in a second table referenced by said index, information comprising a dialog identification, a parameter list, and said generated program code; and
   (5) displaying, in a scrollable table, said plurality of program components, wherein each of said program components forms a row in said scrollable table that comprises at least one of an icon and generated program code, wherein the ordering of said plurality of rows in said scrollable table corresponds to the ordering of said program components in said computer program;
   wherein said generated program code is generated through user interactions with command and template dialogs, said dialogs being associated with commands from a computer programming language, each of said commands being in a form and having a syntax defined by said computer programming language.

16. A computer program product, comprising:
   a computer usable medium having computer readable program code means embodied in said medium for managing program execution, said computer readable program code means comprising:
      computer readable program code means for causing a computer to effect a generation of a scrollable table that contains a plurality of rows, each of said plurality of rows containing at least one program component;
      computer readable first program code means for causing said computer to effect a placement of one or more icons in a first column in at least one of said plurality of rows in said scrollable table, wherein an icon in a particular row provides an object representation for said at least one program component in said particular row; and
      computer readable second program code means for causing said computer to effect a placement of generated program code for said program components in a second column of said scrollable table, wherein the ordering of said plurality of rows in said scrollable table corresponds to the ordering of said program components in said computer program;
      wherein said generated program code is generated through user interactions with command and template dialogs, said dialogs being associated with commands from a computer programming language, each of said commands being in a form and having a syntax defined by said computer programming language.

17. The computer program product of claim 16, wherein program parameters, if any, in said generated program code are represented by user-defined character strings.

18. The computer program product of claim 17, wherein each of said program parameters has a parameter type, wherein said parameter type is at least one of:

(1) a required parameter;

(2) a user parameter;

(3) a fixed value parameter;

(4) a multiselect parameter;

(5) a conditional parameter; and (6) a non-required parameter.

19. A method for developing and editing computer programs by manipulating object representations of dialog generated program components, comprising the steps of:

(1) enabling a user to construct a computer program for a plurality of program components by selectively invoking a plurality of dialogs, said dialogs being associated with commands from a computer programming language, wherein each of said commands causes a computer to perform a particular function;

(2) associating an object representation with each of said plurality of program components;

(3) causing the computer to generate code corresponding to at least one command associated with each of said invoked dialogs, said code being in a form and having a syntax defined by said computer programming language;

(4) causing the computer to automatically insert said code into said computer program being constructed by said user; and (5) displaying said object representation and said code corresponding to said each of said invoked dialogs in a scrollable table comprising a plurality of rows, each of said rows dedicated to a program component, wherein each of said rows comprises a first column containing an object representation of said program component and a second column containing code of said program component, wherein the ordering of said plurality of rows in said scrollable table corresponds to the ordering of said program components in said computer program.

20. The method of claim 19, wherein said user may alter the order of program execution of said computer program by modifying the ordering of rows in said scrollable table.

21. The method of claim 19, wherein a user may edit said code by altering the invocation of said each of said invoked dialogs.

22. The method of claim 21, wherein said altering of the invocation of said each of said invoked dialogs comprises the step of editing attributes of said each of said invoked dialogs.

23. The method of claim 19, wherein a user may edit said code by manipulating program parameters represented by user-defined character strings.

* * * * *